US012538228B2

(12) United States Patent
Elshafie et al.

(10) Patent No.: US 12,538,228 B2
(45) Date of Patent: Jan. 27, 2026

(54) LOW-POWER WAKEUP RADIO SIGNALING IN WIRELESS COMMUNICATIONS

(71) Applicant: QUALCOMM Incorporated, San Diego, CA (US)

(72) Inventors: Ahmed Elshafie, San Diego, CA (US); Huilin Xu, Temecula, CA (US); Wanshi Chen, San Diego, CA (US); Linhai He, San Diego, CA (US); Peter Gaal, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 18/174,398

(22) Filed: Feb. 24, 2023

(65) Prior Publication Data

US 2024/0292330 A1 Aug. 29, 2024

(51) Int. Cl.
*H04B 1/38* (2015.01)
*H04W 52/02* (2009.01)
*H04W 88/04* (2009.01)

(52) U.S. Cl.
CPC ........ *H04W 52/0229* (2013.01); *H04W 88/04* (2013.01)

(58) Field of Classification Search
CPC ............. H04W 52/02; H04W 52/0206; H04W 52/0209; H04W 52/0229; H04W 52/28; H04W 72/25; H04W 72/27
See application file for complete search history.

(56) References Cited

U.S. PATENT DOCUMENTS

| | | | | |
|---|---|---|---|---|
| 10,917,847 | B2 * | 2/2021 | Nam | H04W 52/0216 |
| 2017/0318047 | A1 * | 11/2017 | Hampel | H04W 8/005 |
| 2020/0163017 | A1 * | 5/2020 | Priyanto | H04W 88/04 |
| 2021/0076450 | A1 * | 3/2021 | Jiang | H04W 76/28 |

FOREIGN PATENT DOCUMENTS

| | | |
|---|---|---|
| WO | WO-2021232176 A1 | 11/2021 |
| WO | WO-2022028390 A1 | 2/2022 |

OTHER PUBLICATIONS

International Search Report and Written Opinion—PCT/US2024/012504—ISA/EPO—Jun. 3, 2024.

(Continued)

*Primary Examiner* — Tuan Pham
(74) *Attorney, Agent, or Firm* — Holland & Hart LLP

(57) ABSTRACT

Methods, systems, and devices for wireless communications are described. Techniques described herein relate to a user equipment (UE) that may include a wakeup radio in addition to a main radio to monitor for wakeup signals while the UE is in a sleep mode. The wakeup radio receiver may use less power than the main radio. In some examples, a first UE may indicate to a wireless node (e.g., a controlling sidelink UE or a network entity) that the UE is capable of sending wakeup signals to a second UE. In such examples, the wireless node may transmit a wakeup signal intended for the second UE to the first UE based on the capability report. The first UE may relay the wakeup signal to the second UE. Responsive to receiving the wakeup signal, the second UE may wake up the main radio of the second UE for communications.

29 Claims, 12 Drawing Sheets

(56) References Cited

OTHER PUBLICATIONS

Qualcomm Incorporated: "L1 Signal Design and Procedures for LP-WUR", 3GPP TSG RANI Meeting #110bis-e, R1-2210012, 3rd Generation Partnership Project (3GPP), Mobile Competence Centre, 650, Route Des Lucioles, F-06921 Sophia-antipolis Cedex, France, vol. RAN WG1, No. e-Meeting, Oct. 10, 2022-Oct. 19, 2022, Sep. 30, 2022, 12 Pages, XP052259483, Section 2.3.

* cited by examiner

LOW-POWER WAKEUP RADIO SIGNALING IN WIRELESS COMMUNICATIONS

TECHNICAL FIELD

The following relates to wireless communications, including low-power wakeup radio signaling in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Components within a wireless communications system may be coupled (for example, operatively, communicatively, functionally, electronically, and/or electrically) to each other.

SUMMARY

The described techniques relate to improved methods, systems, devices, and apparatuses that support low-power wakeup radio signaling in wireless communications. For example, the described techniques provide for a configuration for wakeup radio signaling. In some examples, a UE may include a wakeup radio in addition to a main radio to monitor for wakeup signals while the UE is in a sleep mode. The wakeup radio receiver uses less power than the main radio, and accordingly inclusion of a wakeup radio saves power at the UE when the UE is in a sleep mode. In some examples, a first UE may indicate to a wireless node (e.g., a controlling sidelink UE or a network entity) that the first UE is capable of sending wakeup signals to a second UE. In such examples, the wireless node may transmit a wakeup signal intended for the second UE to the first UE based on the capability report. The first UE may relay the wakeup signal to the second UE. Responsive to receiving the wakeup signal, the second UE may wake up the main radio of the second UE for communications.

SUMMARY OF THE CLAIMS

A method for wireless communications is described. The method may include transmitting, by a first user equipment (UE), capability information indicating that the first UE is capable of relaying wakeup signaling from a wireless device to a second UE associated with a wakeup radio, receiving the wakeup signaling from the wireless device based on transmitting the capability information, and transmitting the wakeup signaling to the wakeup radio of the second UE.

An apparatus for wireless communications is described. The apparatus may include at least one processor, memory coupled with the at least one processor, and instructions stored in the memory. The instructions may be executable by the at least one processor (e.g., directly, indirectly, after pre-processing, or without pre-processing) to cause the apparatus to transmit, by a first UE, capability information indicating that the first UE is capable of relaying wakeup signaling from a wireless device to a second UE associated with a wakeup radio, receive the wakeup signaling from the wireless device based on transmitting the capability information, and transmit the wakeup signaling to the wakeup radio of the second UE.

Another apparatus for wireless communications is described. The apparatus may include means for transmitting, by a first UE, capability information indicating that the first UE is capable of relaying wakeup signaling from a wireless device to a second UE associated with a wakeup radio, means for receiving the wakeup signaling from the wireless device based on transmitting the capability information, and means for transmitting the wakeup signaling to the wakeup radio of the second UE.

A non-transitory computer-readable medium storing code for wireless communications is described. The code may include instructions executable by a processor (e.g., directly, indirectly, after pre-processing, or without pre-processing) to transmit, by a first UE, capability information indicating that the first UE is capable of relaying wakeup signaling from a wireless device to a second UE associated with a wakeup radio, receive the wakeup signaling from the wireless device based on transmitting the capability information, and transmit the wakeup signaling to the wakeup radio of the second UE.

Some examples of the method, apparatuses, and non-transitory computer-readable medium described herein may further include operations, features, means, or instructions for receiving one or more parameters for transmitting the wakeup signaling to the second UE, the one or more parameters including a repetition factor, a transmit power, a periodicity, a waveform, a modulation and coding scheme, or any combination thereof, where transmitting the wakeup signaling may be based on the one or more parameters.

Some examples of the method, apparatuses, and non-transitory computer-readable medium described herein may further include operations, features, means, or instructions for receiving a request to update the one or more parameters from the second UE based at least in part on an indication in the capability information that the first UE may be capable of receiving wakeup radio signaling from the second UE.

Some examples of the method, apparatuses, and non-transitory computer-readable medium described herein may further include operations, features, means, or instructions for receiving an update of the one or more parameters from the wireless device based on an indication in the capability information that the first UE may be not capable of receiving wakeup radio signaling from the second UE, where the wireless device includes a network entity.

Some examples of the method, apparatuses, and non-transitory computer-readable medium described herein may further include operations, features, means, or instructions for transmitting, via the capability information, an indication of one or more wakeup message types that the first UE may be capable of transmitting, the one or more wakeup message types including a wakeup signal, a wakeup reference signal, a synchronization signal, or any combination thereof, where transmitting the wakeup signaling includes transmitting one of the wakeup message types transmitted via the capability information.

In some examples of the method, apparatuses, and non-transitory computer-readable medium described herein, transmitting the wakeup signaling may include operations, features, means, or instructions for transmitting the wakeup signaling to a wakeup radio of the second UE indicating that the second UE may be to wake up a main radio of the second UE for wireless communications via a first radio access technology of a set of multiple radio access technologies supported by the second UE, where the wakeup signaling includes a first waveform of a set of multiple waveforms corresponding to respective radio access technologies of the set of multiple radio access technologies, or may be transmitted via a first set of resources of a set of multiple sets of resources corresponding to respective radio access technologies of the set of multiple radio access technologies.

Some examples of the method, apparatuses, and non-transitory computer-readable medium described herein may further include operations, features, means, or instructions for transmitting, via the capability information, an indication that the first UE may be capable of supporting a wakeup radio, or both a wakeup radio and a main radio, for a set of frequency resources, an indication of one or more candidate parameters for the wakeup signaling corresponding to the wakeup radio, the main radio, or both, or any combination thereof.

Some examples of the method, apparatuses, and non-transitory computer-readable medium described herein may further include operations, features, means, or instructions for transmitting, to the second UE, an indication of a threshold distance from the wireless device corresponding to wakeup signaling, where receiving the wakeup signaling from the wireless device may be based on a location of the second UE satisfying the threshold distance.

In some examples of the method, apparatuses, and non-transitory computer-readable medium described herein, transmitting the capability information may include operations, features, means, or instructions for transmitting an initial registration message, a random access message, a radio resource control message, or any combination thereof, to the wireless device, where the wireless device includes a network entity.

In some examples of the method, apparatuses, and non-transitory computer-readable medium described herein, transmitting the capability information may include operations, features, means, or instructions for transmitting a sidelink control information message, a sidelink radio resource control message, or any combination thereof, to the wireless device, where the wireless device includes a primary sidelink UE.

Some examples of the method, apparatuses, and non-transitory computer-readable medium described herein may further include operations, features, means, or instructions for transmitting the capability information may be based on a power level or charging rate at the first UE satisfying a threshold.

Some examples of the method, apparatuses, and non-transitory computer-readable medium described herein may further include operations, features, means, or instructions for transmitting, via the capability information using a main radio or a wakeup radio of the first UE, an indication that the first UE supports a discontinuous reception operation.

Some examples of the method, apparatuses, and non-transitory computer-readable medium described herein may further include operations, features, means, or instructions for selecting a discontinuous reception cycle based on the indication that the first UE supports the discontinuous reception operation, where transmitting the wakeup signaling to the wakeup radio of the second UE may be based on the discontinuous reception cycle.

A method for wireless communications is described. The method may include receiving control signaling including one or more parameters for receiving wakeup signaling from a first UE by a second UE associated with a wakeup radio, monitoring for the wakeup signaling according to the one or more parameters, and receiving the wakeup signaling from a wireless device via the first UE based on the monitoring.

An apparatus for wireless communications is described. The apparatus may include at least one processor, memory coupled with the at least one processor, and instructions stored in the memory. The instructions may be executable by the at least one processor (e.g., directly, indirectly, after pre-processing, or without pre-processing) to cause the apparatus to receive control signaling including one or more parameters for receiving wakeup signaling from a first UE by a second UE associated with a wakeup radio, monitor for the wakeup signaling according to the one or more parameters, and receive the wakeup signaling from a wireless device via the first UE based on the monitoring.

Another apparatus for wireless communications is described. The apparatus may include means for receiving control signaling including one or more parameters for receiving wakeup signaling from a first UE by a second UE associated with a wakeup radio, means for monitoring for the wakeup signaling according to the one or more parameters, and means for receiving the wakeup signaling from a wireless device via the first UE based on the monitoring.

A non-transitory computer-readable medium storing code for wireless communications is described. The code may include instructions executable by a processor (e.g., directly, indirectly, after pre-processing, or without pre-processing) to receive control signaling including one or more parameters for receiving wakeup signaling from a first UE by a second UE associated with a wakeup radio, monitor for the wakeup signaling according to the one or more parameters, and receive the wakeup signaling from a wireless device via the first UE based on the monitoring.

In some examples of the method, apparatuses, and non-transitory computer-readable medium described herein, the one or more parameters include a repetition factor, a transmit power, a periodicity, a waveform, a modulation and coding scheme, or any combination thereof and receiving the wakeup signaling may be based on the one or more parameters.

Some examples of the method, apparatuses, and non-transitory computer-readable medium described herein may further include operations, features, means, or instructions for transmitting, to the wireless device or the first UE, a request for the one or more parameters prior to entering a sleep mode, where receiving the one or more parameters may be based on transmitting the request.

In some examples of the method, apparatuses, and non-transitory computer-readable medium described herein, transmitting the request for the one or more parameters may include operations, features, means, or instructions for transmitting an indication of one or more candidate parameters including the one or more parameters based on a current location of the second UE, a power state of the second UE, a charging rate profile at the second UE, or any combination thereof.

Some examples of the method, apparatuses, and non-transitory computer-readable medium described herein may further include operations, features, means, or instructions for transmitting, to the wireless device or the first UE, a request to update the one or more parameters, receiving, from the wireless device or the first UE, an update of the one or more parameters based on transmitting the request, and receiving additional wakeup signaling from the first UE according to the update of the one or more parameters.

In some examples of the method, apparatuses, and non-transitory computer-readable medium described herein, receiving the wakeup signaling may include operations, features, means, or instructions for receiving the wakeup signaling using the wakeup radio of the second UE, the wakeup signaling indicating that the second UE may be to wake up a main radio of the second UE for wireless communications via a first radio access technology of a set of multiple radio access technologies supported by the second UE, where the wakeup signaling includes a first waveform of a set of multiple waveforms corresponding to respective radio access technologies of the set of multiple radio access technologies, or may be transmitted via a first set of resources of a set of multiple sets of resources corresponding to respective radio access technologies of the set of multiple radio access technologies.

In some examples of the method, apparatuses, and non-transitory computer-readable medium described herein, the one or more parameters include an indication of the set of multiple radio access technologies, the set of multiple sets of resources, the set of multiple waveforms, or any combination thereof.

Some examples of the method, apparatuses, and non-transitory computer-readable medium described herein may further include operations, features, means, or instructions for receiving, from the wireless device or the first UE, an indication of a set of candidate UEs including the first UE, each of the set of candidate UEs being capable of relaying wakeup signaling to the second UE, where the monitoring may be based on the indication of the set of candidate UEs.

Some examples of the method, apparatuses, and non-transitory computer-readable medium described herein may further include operations, features, means, or instructions for transmitting capability information indicating that the second UE may be capable of receiving wireless signaling via the wakeup radio, or both the wakeup radio and a main radio, for a set of frequency resources, the capability information further including an indication of one or more candidate parameters for the wakeup signaling corresponding to the wakeup radio, the main radio, or both, or any combination thereof.

Some examples of the method, apparatuses, and non-transitory computer-readable medium described herein may further include operations, features, means, or instructions for transmitting one or more reference signals to the wireless device prior to entering a sleep mode, the wireless device including a network entity, where receiving the wakeup signaling from the wireless device via the first UE may be based on transmitting the one or more reference signals.

Some examples of the method, apparatuses, and non-transitory computer-readable medium described herein may further include operations, features, means, or instructions for transmitting, to the wireless device, mobility information indicating a location of the second UE, a direction of the second UE, a speed of the second UE, an indication that the second UE may be exiting a coverage area, or any combination thereof, where receiving the wakeup signaling from the wireless device via the first UE may be based on transmitting the mobility information.

In some examples of the method, apparatuses, and non-transitory computer-readable medium described herein, the wireless device includes a network entity or a sidelink UE.

Some examples of the method, apparatuses, and non-transitory computer-readable medium described herein may further include operations, features, means, or instructions for transmitting, using a main radio or a wakeup radio of the second UE, capability information including an indication that the second UE supports a discontinuous reception operation.

Some examples of the method, apparatuses, and non-transitory computer-readable medium described herein may further include operations, features, means, or instructions for selecting a discontinuous reception cycle based on the indication that the second UE supports the discontinuous reception operation, where receiving the wakeup signaling from the wireless device via the first UE may be based on the discontinuous reception cycle.

DETAILED DESCRIPTION

Some wireless communication systems may support multiple communication links (e.g., a cellular link (which may be referred to as a Uu link) between a network entity and one or more user equipments (UEs), and a sidelink (which may be referred to as a PC5 interface) between UEs). In some cases, to reduce power consumption, a UE may put a main radio into a sleep state (e.g., may enter a sleep mode). In such cases, the UE may be equipped with a low power wakeup radio (LP-WUR) to wake up the main radio upon receiving a low power wakeup signal (LP-WUS). In some examples, the network entity may serve UEs in various coverage areas, located close or far away from the network entity. UEs located close to the network entity (e.g., in a first coverage area) may successfully receive downlink signaling via a main radio, wakeup signaling via a LP-WUR, or both.

However, UEs located far from the network entity (e.g., in a second coverage area) may not be capable of reliably receiving a LP-WUS from a network entity due to being located within the second coverage area.

Various aspects of the present disclosure relate to UE and network capability signaling and forwarding of wakeup signaling. In some examples, a network entity may communicate with a first UE and a second UE. If the network entity transmits a LP-WUS to the second UE equipped with a LP-WUR, the second UE may be unable to receive the LP-WUS due to being outside of an LP-WUS coverage area (e.g., the first coverage area). In such cases, the first UE (e.g., located inside the LP-WUS coverage area) may relay the LP-WUS to the second UE. In such cases, the network entity may indicate to the first UE that an LP-WUS is intended for the second UE. In some examples, the first UE may indicate to the network entity the capability of the first UE to send LP-WUR signals to the second UE. The first UE may send the indication using a main radio or an LP-WUR. In some implementations, the first UE may receive an LP-WUS from the network entity and may relay the LP-WUS to the second UE. In some implementations, the first UE may receive an indication that the network entity intends a LP-WUS to be transmitted to the second UE, and based on receiving the indication, the first UE may generate and transmit an LP-WUS to the first UE.

Aspects of the disclosure are initially described in the context of wireless communications systems. Aspects of the disclosure are additionally illustrated with reference to process flows. Aspects of the disclosure are further illustrated by and described with reference to apparatus diagrams, system diagrams, and flowcharts that relate to low-power wakeup radio signaling in wireless communications.

Figure 1:
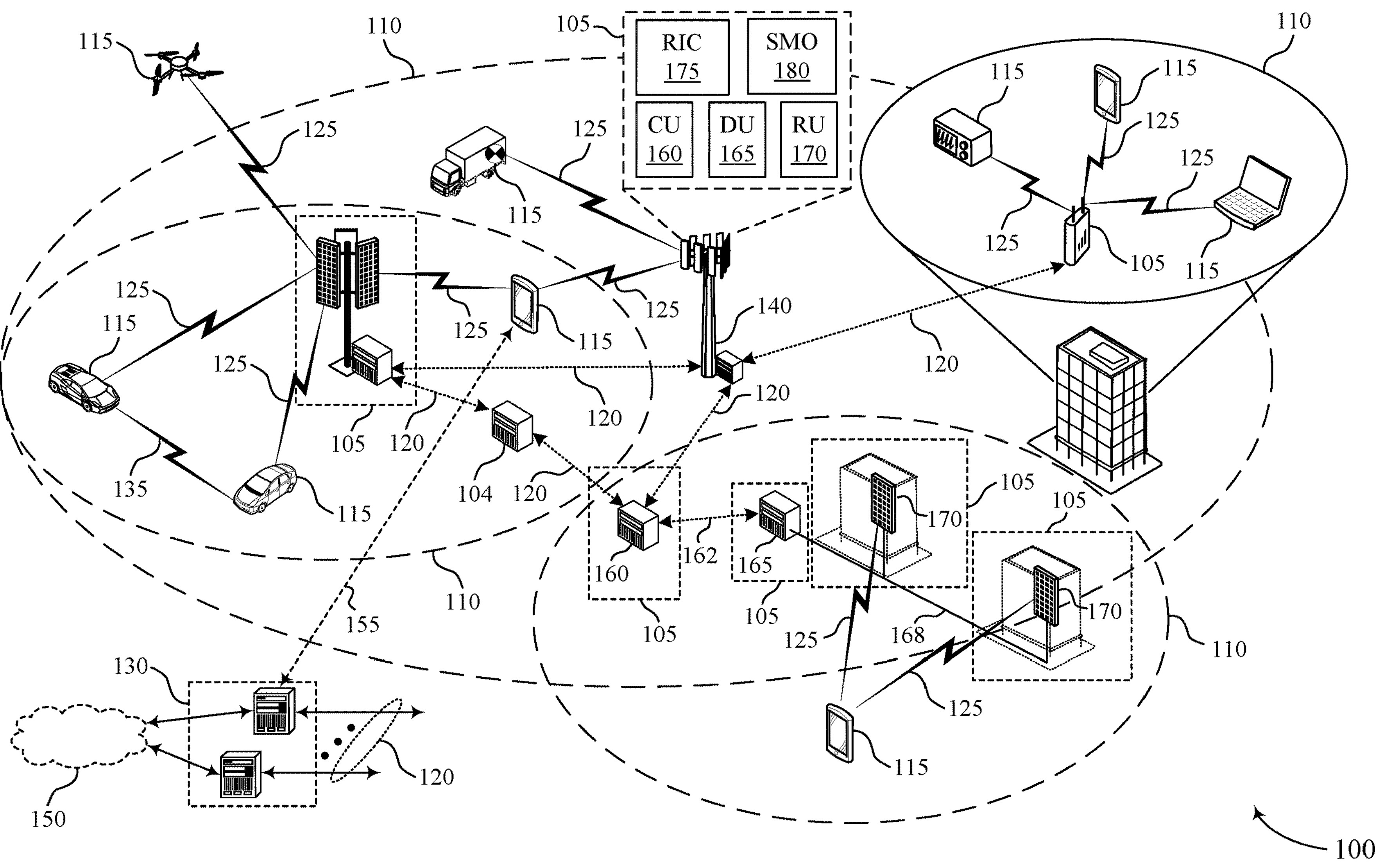
FIG. 1 illustrates an example of a wireless communications system that supports low-power wakeup radio signaling in wireless communications in accordance with one or more aspects of the present disclosure.

FIG. 1 illustrates an example of a wireless communications system 100 that supports low-power wakeup radio signaling in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support low-power wakeup radio signaling in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a UE 115 may include a wakeup radio receiver in addition to a main radio. The wakeup radio may monitor for wakeup signals, low power reference signals (for channel estimation), and/or low power synchronization signals (for synchronization) while the UE 115 is in a sleep mode. The wakeup radio receiver uses less power than the main radio, and accordingly inclusion of a wakeup radio saves power at the UE 115 when the UE 115 is in a sleep mode. A wireless node (e.g., a network entity 105 or a UE 115) may be in communication with a first UE 115 and a second UE 115. The wireless node may wake up the second UE 115 via transmitting a wakeup signal to the second UE 115, and then the second UE 115 may communicate with the wireless node or via sidelink with another UE 115. If the second UE 115 is out of range of the wireless node, the wireless node may be unable to transmit a wakeup signal to the second UE 115. In such examples, the wireless node may transmit a wakeup signal intended for the second UE 115 to the first UE 115, which may be within range of the wireless node. The first UE 115 may then relay the wakeup signal to the second UE 115. The first UE 115 may transmit a capability report to the wireless node. Based on the capability report, the wireless node may transmit a wakeup signal to the first UE 115. The first UE 115 may then transmit the wakeup signal to the second UE 115. Based on receiving the wakeup signal, the second UE 115 may wake up the main radio of the second UE 115 for cellular communications (e.g., through Uu link) or for sidelink communications.

Figure 2:
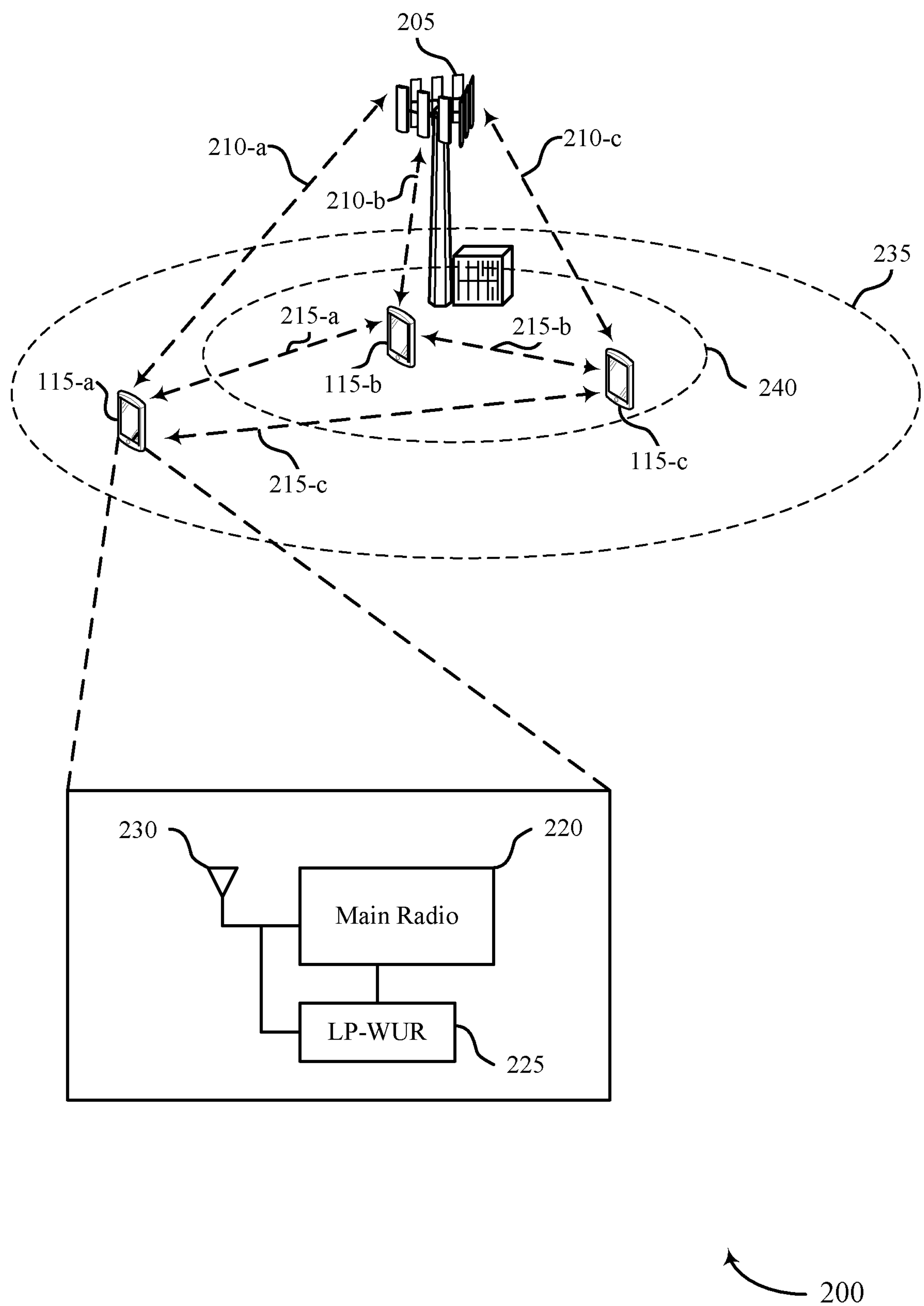
FIG. 2 illustrates an example of a wireless communication system that supports low-power wakeup radio signaling in wireless communications in accordance with one or more aspects of the present disclosure.

FIG. 2 illustrates an example of a wireless communications system 200 that supports low-power wakeup radio signaling in wireless communications in accordance with one or more aspects of the present disclosure. The wireless communication system may include a first UE 115-*a*, a second UE 115-*b*, a third UE 115-*c*, and a wireless node 205, which may be examples of corresponding devices as described herein, including with reference to FIG. 1. The wireless node 205 may communicate with UEs 115 over cellular communication links 210, which may be cellular interfaces (e.g., Uu link). The UEs 115 may communicate with each other over sidelink communication links 215, which may be sidelink interfaces (e.g., a PC5 link) or Uu links.

The UEs 115 may both be equipped with a main radio (MR) 220, a low power wakeup radio (LP-WUR) 225, one or more antennas 230, or any combination thereof. In some examples, the MR 220 may include separate modems for the sidelink interface and the Uu interface (for example, with some common components, and in some examples, with no common components). In some cases where a UE 115 may possess both a MR 220 and a LP-WUR 225, the UE 115 may use both radios to transmit signals, may use both radios to receive signals, may use one radio for transmitting signals and the other for receiving signals, or any combination thereof. The LP-WUR 225 may be associated with a different physical layer (e.g., L1) from the MR 220. In some examples, the LP-WUR 225 may be associated with different physical layers (e.g., L1, L2, L3, or a combination thereof) than the MR 220.

In some examples, the LP-WUR 225 may monitor for wakeup signaling (e.g., wakeup signals (WUS), low power reference signals (LP-RS), and/or low power synchronization signals (LP-SS) while the MR 220 is in a sleep state. The wakeup signaling may indicate to the UE 115 to wake up the MR 220 (e.g., for communications via a cellular communication link 210, a sidelink communication link 215, or both). The wakeup signaling may be either a low power wakeup signal (LP-WUS) or physical downlink control channel-based wakeup signal (PDCCH-WUS). The LP-WUR 225 may use less power than the MR 220, and accordingly using the LP-WUR 225 saves power at a UE 115 (e.g., allowing the UE 115 to effectively enter sleep mode without missing transmissions). In some examples, the LP-WUR 225 may be powered separately from the MR 220 and powered by less power consuming blocks. In some examples, the LP-WUR 225 may wake up the MR 220 when actual communication is needed. The LP-WUR 225 may reduce total power consumption by the UE 115 by avoiding unnecessary wakeup of the MR 220 which may be associated with a higher power consumption. In some examples, the LP-WUR 225 may reduce latency. For example, since the LP-WUR 225 consumes low power, the LP-WUR 225 may more frequently monitor for wakeup signaling, reducing average latency while maintaining low power consumption.

The wireless node 205 may provide coverage over a first geographic coverage area 235 and a second geographic coverage area 240. The first geographic coverage area 235 may be associated with PDCCH-WUSs. The second geographic coverage area 240 may be associated with LP-WUSs. In some examples, the second geographic coverage area 240 may be smaller than the first geographic coverage area 235. In some cases, the wireless node 205 may not transmit wakeup signaling to the UE 115-*a* because the UE 115-*a* is located outside a second geographic coverage area 240 associated with LP-WUSs and may be unable to reliably receive wakeup signaling from the wireless node 205. A second UE 115-*b* may be inside a second geographic coverage area 240 associated with LP-WUSs and may be able to receive wakeup signaling from the wireless node 205. The UE 115-*b* may indicate the capability of the UE 115-*b* to transmit (e.g., relay) wakeup signaling to the UE 115-*a* to the wireless node 205.

Based on receiving the capability indication, the wireless node 205 may transmit an indication of wakeup signaling to the UE 115-*b*. In some cases, the UE 115-*b* may relay (e.g., amplify and forward (AF) or decode and forward (DF)) the wakeup signaling to the UE 115-*a*. In some cases, the UE 115-*b* may generate the wakeup signaling to send to the UE 115-*a* based on receiving the indication of the wakeup signaling from the wireless node 205. Based on the receiving the indication, the UE 115-*b* may transmit the wakeup signaling to the UE 115-*a*. The wireless node 205 (e.g., a network entity 105 or the UE 115-*c*) may send an indication of the wakeup signaling to the UE 115-*b* (e.g., via a compatible receiver at the UE 115-*b*, which may be any transmission signal that the UE 115-*b* supports, such as wakeup radio transmission signals, or MR signaling).

In some cases, the UE 115-*b* may be within both the first geographic coverage area 235 and the second geographic coverage area 240. In such cases, the wireless node 205 may still relay wakeup signaling for the UE 115-*a* to the UE 115-*a* to further enhance reliability and allow for faster wakeup with fewer errors. Thus, techniques described herein may include capability signaling for helper UEs 115 (e.g., such as the UE 115-*b*) to support wakeup signaling for LP-WUR aided UEs 115 (e.g., such as the UE 115-*a*) from the network (e.g., network entities 105).

In some examples, the wakeup signaling may indicate that the UE 115-*a* is to wake up the MR 220 (e.g., the Uu modem) for the Uu link, or may indicate that the UE 115-*a* is to wake up the MR 220 for sidelink communication with one or more additional UEs 115 (e.g., including the UE 115-*b*, or a PLC or controlling unit, such as the UE 115-*c*). The communication of wakeup signaling from the UE 115-*b* to the UE 115-*a* may be performed using dedicated resources. In some cases, these resources are configured and assigned by the wireless node 205 (e.g., through a resource grant). In some other cases, the resources are discovered and assigned by the UE 115-*b*. The UE 115-*b* may transmit WUSs during low-power occasions. In some examples, there may be low-power monitoring occasions configured for Uu communications, sidelink communications, or both. In some examples, the Uu occasions and sidelink occasions may be the same occasion. Additionally, there may be additional monitoring occasions for LP-RS and LP-SS. For example, resources may be configured, or may be dedicated resources or grants on which to send information about wakeup signaling (e.g., LP-WUS, LP-RS, LP-SS) to one or more UEs 115-*c*. Resources used by the UE 115-*b* for transmitting wakeup signaling to the UE 115-*a* may be assigned or configured by the wireless node 205 (e.g., a network entity 105 or the UE 115-*c*. That is, even for sidelink wakeup signaling, resources could be assigned by a network entity 105 or a sidelink control device such as the UE 115-*c*). In some examples, the resources may be assigned or found or configured by the helper UE 115-*b*. In such examples, the UE 115-*b* may indicate the configured occasions (e.g., which may be referred to as low power occasions or WUS monitoring occasions). The LP-WUS monitoring occasions may be allocated for Uu links, LP-WUS monitoring occasions for sidelink, or a single set of monitoring occasions. Different monitoring occasions may be configured for LP-SSs, LP-RSs, WUSs, etc.

For instance, a first subset of resources may be allocated for waking up the Uu modem, a second subset of resources may be allocated for waking up the sidelink modem. The first subset of resources and the second subset of resources may be entirely separate in time, frequency, or both, or may at least partially overlap in time, frequency, or both. If the wakeup signaling is sent via the first subset of resources, the UE 115-*a* may wake up the Uu modem, while if the wakeup signaling is sent via the second subset of resources, the UE 115-*a* may wake up the sidelink modem.

In some examples, the UE 115-*c* may act as a primary sidelink UE for the UEs 115. In such examples, the UE 115-*b* may indicate capability information to the UE 115-*c* over connection link 215-*b*. Based on receiving the indication of capability information, the UE 115-*c* may indicate wakeup signaling to the UE 115-*b*. Upon receiving the indication of the wakeup signaling, the UE 115-*b* may send the wakeup signaling to the UE 115-*a*. In some cases, the UE 115-*c* may allocate resources for sending and receiving the wakeup signaling for UE 115-*b*. In some other cases, the resources are discovered and assigned by the UE 115-*b*.

In some examples, the UE 115-*b* may indicate (e.g., in capability signaling sent to the wireless node 205, or the UE 115-*c*, or both) a capability to support a compatible receiver for communications with the LP-WUR-aided UEs 115 (e.g., the UE 115-*a*). Such compatibility may allow the UE 115-*b* to receive transmitted signals from the LP-WUR transmitter (e.g., if the UE 115-*a* has a LP-WUR that is capable of transmitting wakeup signaling to the UE 115-*b*). As described in greater detail with reference to FIG. 3, the UE 115-*a* may be able to transmit feedback signaling, or request (e.g., such as a request to change a configuration for one or more low power signals) to one or more helper UEs 115 (e.g., the UE 115-*b*). The requested change of configuration for the one or more low power signals may include a requested update to a repetition, transmit power, periodicity, waveform, modulation, etc. In some examples, the UE 115-*a* may transmit such requests or feedback information to the UE 115-*b* (e.g., using the LP-WUR at the UE 115-*a*) based on a reported capability of the UE 115-*b* to receive LP-WUR signaling. In some examples, the UE 115-*a* may transmit such requests or feedback information to the wireless node 205 (e.g., if the UE 115-*b* does not support reception of LP-WUR transmitted signals). In such examples, the network may inform the UE 115-*b* about the requested changes to wakeup signaling configuration. The UE 115-*a* may send such requests and feedback signaling to the wireless node 205 via a MR 220, or via a LP-WUR 225 with transmission capability.

In some examples, the wakeup signaling (e.g., the LP-WUS, LP-RS, LP-SS) may be designed with different modulation and waveforms (e.g., for different use cases). The waveform may be a single-tone wave (e.g., sine wave) or a multi-tone wave (e.g., OFDM-based waveform). The modulation used may be on-off keying (OOK), amplitude-shift keying (ASK), frequency-shift keying (FSK), phase-shift keying (PSK), Zadoff Chu, discrete Fourier transform (DFT), Walshi/Hadamard, Gold, Reed-Solomon, m-sequence, or Chirp, among other examples. In some examples, the modulation may occur in the time domain, the frequency domain, or both. For example, the LP-WUS may be an OOK signal, a sequence-based signal, or a coded signal (e.g., PDCCH-based DCI). The LP-RS and LP-SS may be an OOK signal, a sequence-based signal, or a signal similar to a single side band (SSB), a channel state information reference signal (CSI-RS), a sounding reference signal (SRS), a positioning reference signal (PRS), tracking reference signal (TRS), or a phase tracking reference signal (PTRS) in New Radio (NR) or Long-Term Evolution (LTE) communication systems. For the OOK-based and ASK-based waveform designs, Manchester code may be used to simplify receiver implementation and improve resistance to interference. For example, forward error correction codes and other channel codes may be applied to the waveforms achieve higher reliability.

In some examples, the UE 115-*b* (e.g., or the UE 115-*a*, or both) may report capability information for sending specific types of signaling, such as LPWUSs, LP-RSs, LP-SSs, or any combination thereof (e.g., or may indicate which types of wakeup signaling that the UE 115-*b* supports or does not support forwarding or transmitting to the UE 115-*a*). In some examples, such capability signaling may be dynamic over time, where some signals or configurations may be activated or deactivated. As described herein, wakeup signaling (e.g., LP-WUS, LP-RS, LP-SS, among other examples) may be OOK based, or may be OFDM based waveforms.

Figure 3:
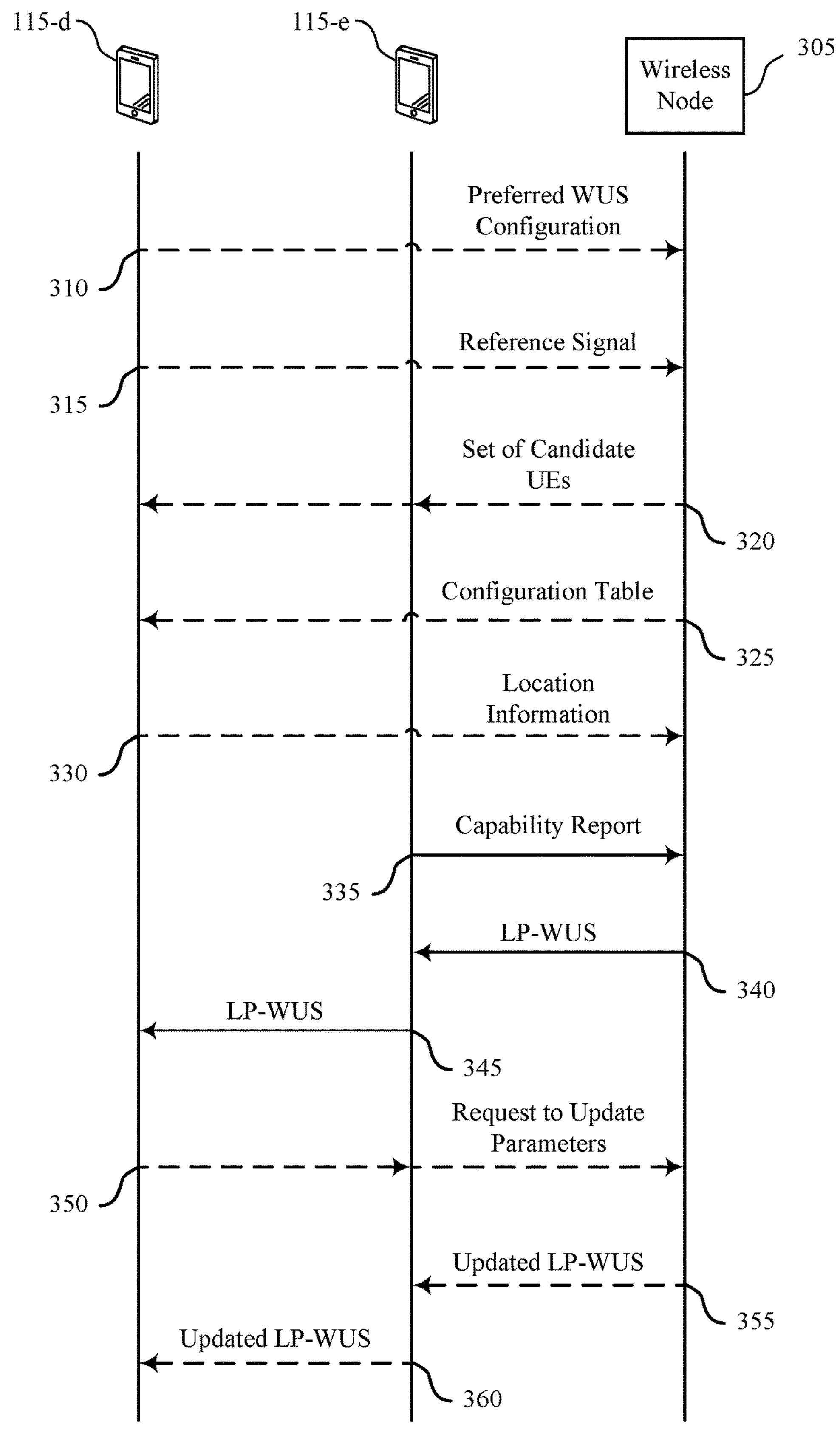
FIG. 3 illustrates an example of a process flow that supports low-power wakeup radio signaling in wireless communications in accordance with one or more aspects of the present disclosure.

In some examples, as described in greater detail with reference to FIG. 3, the UE 115-*a* may be provided with a list of potential (e.g., candidate) helper UEs 115 (e.g., including the UE 115-*b*). In some examples, the UE 115-*a* may determine or receive the list of helper UEs 115 with aid from the wireless node 205, or a controlling unit or PLC such as the UE 115-*c*, or a combination thereof). Prior to going to sleep, the UE 115-*a* may receive an indication of the list and may monitor resources used by the indicated helper UEs 115 (e.g., using the LP-WUR 225). The resources associated with the helper UEs 115 may be indicated via the list of candidate helper UEs 115 or may otherwise configured at the UE 115-*a* (e.g., via separate control signaling, configuration information, or the like, as described herein). The list may support the UE 115-*a* while monitoring for wakeup signaling for the Uu link, the sidelink, or both (e.g., two separate lists may be configured indicating helper sidelink UEs 115 and helper Uu UEs 115, a single list may indicate all helper UEs 115 for all available links, or the list of helper UEs may be configured in connection with the configuration of resources associated with different lists, among other examples).

In some examples, the UE 115-*a*, the UE 115-*b*, or both may support discontinuous transmission (DTX) and reception (DRX) operations. The network entity 105-*a* may configure the UEs 115 with a DRX configuration (e.g., DRX may refer to both DRX and DTX operations). A DRX operation may include an active time (e.g., a period during which signals may be transmitted, received, or both) and a cycle duration (e.g., a periodicity of active times). During a DRX active time, the UE 115-*a* may send wakeup signaling (e.g., LP-WUS, other low-power signaling) to the UE 115-*b* according to a periodicity of signaling. In some cases, some signals (e.g., LP-SS, LP-RS) may be untied to DRX operations. In some other cases, such signals may be associated with another DRX operation (e.g., a DRX cycle or configuration specific to some types of wakeup signaling, such as LP-SS, LP-RS, or both).

In some examples, the UE 115-*a* (e.g., or the UE 115-*b*, or both) may report capability information for supporting DRX operations at a LP-WUR. In some examples, such capability signaling may be dynamic over time. The DRX configuration information may be indicated in a class message (e.g., a WUR class, a UE class containing a WUR class may contain such DRX related information). Additionally, or alternatively, DRX configuration information may be associated with a certain clock, or clock conditions (e.g., clock accuracy), which may be a function of an RRC state, a power state, a power saving state of the MR 220, a power saving state of the LP-WUR 225, or any combination thereof. The capability information may be sent via a MR 220, or via a LP-WUR 225 with transmission capability.

The UE 115-*a* may receive wakeup signaling from the UE 115-*b* according to a DRX cycle. The DRX cycle and associated clock accuracies may be selected based on the capability information of the UE 115-*a* and the capability information of the UE 115-*b*. In some cases, the DRX cycle may be associated with a DTX cycle, which may be further associated with a UE 115-*b*, a wireless node 205, or a UE 115-*c*. In some cases, UEs 115 may negotiate DRX and DTX configuration based on capability information. In some other cases, the wireless node 205 may select a configuration based on the capability information. Additionally, or alternatively, the wireless node 205 may determine multiple configurations, and the UEs 115 may select one configuration based on the static or dynamic capability information (e.g., or both) of the UEs 115.

In some examples, LP-WUR signaling and PDCCH-based signaling may be associated with the same coverage area (e.g., may have similar effectiveness for the UE 115-*a* and the UE 115-*b*), LP signaling by the helper UE 115-*b* may still enhance reliability and allow for quick wakeup (e.g., resulting in reduced errors). In some examples, the wireless node 205 may utilize the helper UE 115-*b* to relay or transmit wakeup signaling to the UE 115-*a*, even in the case where the wireless node 205 is capable of transmitting wakeup signaling to the UE 115-*a*, which may result in enhanced reliability of wakeup signaling. FIG. 3 illustrates an example of a process flow 300 that supports low-power wakeup radio signaling in wireless communications in accordance with aspects of the present disclosure. The process flow 300 may implement aspects of the wireless communications system 100 and the wireless communications system 200 as described with reference to FIGS. 1 and 2. For instance, in the example of FIG. 3, a wireless node 305 may communicate with one or more UEs 115 (e.g., UEs 115-*d* and 115-*e*) which may be located in one or more coverage areas (e.g., cells), as described with reference to FIGS. 1 and 2. The wireless node 305 may be an example of a UE or a network entity as described with reference to FIGS. 1 and 2. The wireless node 305 may communicate with the UEs 115 via respective communication links, which may be examples of communication links 210 as described with reference to FIG. 2. Furthermore, the UEs 115 may communicate with each other via respective communication links, which may be examples of communication links 215 described with reference to FIG. 2. In the following description of the process flow 300, the operations between the wireless node 305, the first UE 115-*d*, and the second UE 115-*e* may be transmitted in a different order than the example order shown, or the operations between the wireless node 305, the first UE 115-*d*, and the second UE 115-*e* may be performed in different orders or at different times. Some operations may also be omitted from the process flow 300, and other operations may be added to the process flow 300.

At 335, the UE 115-*e* sends an indication of capability information (e.g., a capability report) to the wireless node 305. The capability report may indicate an ability of the UE 115-*e* to send LP-WUS to a UE 115-*d* (e.g., an ability to use L1/L2/L3 signals to transmit LP-WUS). Additionally, the capability report may include an indication of the ability of the UE 115-*e* to receive low-power signals. The capability report may indicate whether the UE 115-*e* supports forwarding of any or all wakeup signaling, or may specifically indicate whether the UE 115 supports sending specific types of wakeup signaling (e.g., WUS, LP-RS, LP-SS, or any combination thereof). In some examples, the capability report may indicate whether the UE 115-*e* is able to operate the MR 220 or LP-WUR 225 alone or together. The UE 115-*e* may report the capabilities of the UE (e.g., for operating one or both radios alone or together) for different frequency bands, band combinations, carrier combinations, or any combination thereof. The capability report may be sent using the MR 220 or the LP-WUR 225 of the UE 115-*e*. The capability report may be included in an initial registration message, a random access message (e.g., msg1 or msg3 in a 4-step random access channel (RACH) procedure, or msgA in a 2-step RACH procedure), a radio resource control message (e.g., during an RRC connection between UEs or between the UE 115-*e* and a network entity), using L1, L2, or L3 signaling in either sidelink communications (e.g., to other UEs 115, a controlling unit, a PLC, or primary UE) or via the Uu link (e.g., to a network entity 105), or any combination thereof. The capability report may be dynamic (e.g., may vary over time) and may be based on the current power state of the UE 115-*d*.

The capability information may indicate whether the UE 115-*e* is capable of performing both LP-WUR signaling and MR signaling at the same time. The capability report may indicate whether the UE 115-*e* supports both LP-WUR signaling and MR signaling at the same time, if the UE 115-*e* may transmit via both circuits, or may receive from both circuits, if the UE 115-*a* supports receiving via one circuit and transmitting via the other circuit, or if the UE 115-*e* supports both the MR and the LP-WUR but cannot support simultaneous LP-WUR signaling and MR signaling, or any combination thereof. As described herein, the capability signaling (e.g., indicating whether the UE 115-*e* supports LP-WUR alone, or MR and LP-WUR together) may be per band, carrier, band combination, carrier combination, frequency range, or any combination thereof. In some instances, multiple UEs 115 (e.g., including the UE 115-*d*) may transmit the capability report described at 335.

At 340, the wireless node 305 sends an indication of wakeup signaling to the UE 115-*e*. The wireless node 305 may select a configuration of the wakeup signaling based on the last reported battery level of the UE 115-*d*, the energy state profile of the UE 115-*d*, the charging state profile of the UE 115-*d*, the discharging rate profile of the UE 115-*d*, or the latest known position of the UE 115-*d* (e.g., positioning information such as position reference signals), or any combination thereof. In some examples, the UE 115-*d*, the UE 115-*e*, or both, may provide such location information (e.g., or power and charging information) via the location information at 330, the preferred WUS configuration information at 310, or via other reporting or control signaling. The indication may include additional parameters for transmitting the wakeup signaling to the UE 115-*e*. These parameters may include a repetition factor, a transmit power, a periodicity, a waveform, a modulation and coding scheme, or any combination thereof.

At 345, the UE 115-*e* transmits wakeup signaling to the UE 115-*d*. The UE 115-*e* may transmit the wakeup signaling based on the parameters received in the indication from the wireless node 305. As described herein, the wakeup signaling may include a LP-WUS or a PDCCH-WUS. Furthermore, the wakeup signaling may indicate to the UE 115-*d* to wake up the MR 220 for Uu communications, for sidelink communications, or for both.

At 350, the UE 115-*d* may request that the parameters associated with the WUS be updated prior to entering a sleep mode. The request to update the parameters may include a feedback message, a feedback request, a lower power signal configuration change request, or any combination thereof. In some cases, the UE 115-*d* may transmit a request to update the parameters to the UE 115-*e*. In such cases, the UE 115-*d* may transmit the request based on receiving (e.g., from the UE 115-*e* as a part of the capability report, or from the wireless node 305, or a combination thereof), an indication that the UE 115-*e* is able to receive low power signals. In some other cases, the UE 115-*d* may transmit the request to update the parameters to the wireless node 305, based on not receiving, as a part of the capability report, an indication that the UE 115-*e* is able to receive low power signals. In such examples at 355, the wireless node 305 may send updated parameters to the UE 115-*d* based on receiving the request to update the parameters associated with the WUS from the UE 115-*d*. At 360, the UE 115-*e* may send wakeup signaling to the UE 115-*e* again based on receiving the request to update the parameters associated with the wakeup signaling from the UE 115-*d*.

In some examples, the UE 115-*d* may provide configuration or recommendation information. For example, at 310, the UE 115-*d* may send an indication of a preferred configuration (e.g., waveform, modulation, coding) for the low-power signaling to the wireless node 305. In some cases, the UE 115-*d* may send the indication using the MR 220 (over sidelink, cellular link, or both). The UE 115-*d* may send the indication over L1/L2/L3 signaling before going to sleep (e.g., the UE 115-*d* may send the indication before entering an RRC inactivity or IDLE state). In some other cases, the UE 115-*d* may send the indication using the LP-WUR 225. The UE 115-*d* may send the indication to the wireless node 305. Additionally, or alternatively, if the UE 115-*e* has indicated that the UE 115-*e* is capable of receiving low-power signals, the UE 115-*d* may send the indication to the UE 115-*e*. In some examples, the UE 115-*e* may transmit the wakeup signaling to the UE 115-*d* at 345 according to the preferred configuration indicated at 310.

In some examples, the UE 115-*d* may indicate (e.g., via the preferred WUS configuration information) the ability of the UE 115-*d* to operate the MR 220 or the LP-WUR 225 alone or in combination. The operation of the radios may vary for different frequency bands, band combinations, carrier combinations, or any combination thereof. In some examples, the UE 115-*e* may indicate which frequency band, band combination, carrier combination, etc., for which the UE 115-*e* supports operation of the MR 220, the LP-WUR 225, or both. The UE 115-*e* may similarly report the ability of the UE 115-*e* to operate the MR 220, or LP-WUR 225, or both. Additionally, or alternatively, the UE 115-*d* (e.g., or the UE 115-*e*) may send wakeup signal recommendations (e.g., configuration recommendations) for the MR 220, the LP-WUR 225, or both. In such examples, the wireless node 305 may configure the wakeup signaling based on the recommendations sent from the UE 115-*d* and may transmit the wakeup signaling to the UE 115-*d* according to the configuration parameters selected at 310. The UE 115-*d* may indicate a preferred WUS configuration (e.g., waveform, modulation, coding, etc. for each type of low power wakeup signaling) via the MR (e.g., sidelink, Uu link, or both) before the UE 115-*d* enters a sleep mode using L1, L2, or L3 signaling, coming from the MR (e.g., sidelink, Uu link, or both) before the UE 115-*d* enters an RRC inactivity or IDLE state, via the LP-WUR transmitter side (e.g., to the wireless node 305), or via the LP-WUR to the UE 115-*e* (e.g., to another UE 115 having a compatible modem that can receive the LP-WUR transmitted signals).

In some examples, the UE 115-*e* may send recommendations about each type of wakeup signaling for each radio (e.g., the LP-WUR and the MR), and the wireless node 305 may configure the wakeup signaling based thereon.

In some examples, the wireless node 305 may compute a distance of the UE 115-*d* and may transmit the wakeup signaling at 340 for relaying to the UE 115-*d* based on the computed distance. For example, at 315, the UE 115-*d* may send a reference signal to the wireless node 305 before entering a sleep mode. In some cases, the UE 115-*d* may send the reference signal (e.g., a sounding reference signal (SRS), a positioning reference signal (PRS), or another type of reference signal for wakeup signaling forwarding) to the wireless node 305 using the LP-WUR 225. In some other cases, the UE 115-*d* may send the reference signal (e.g., sounding reference signal) to the wireless node 305 using the MR 220 before putting the MR 220 to sleep. Additionally, or alternatively, the wireless node 305 may utilize the reference signal to determine location or mobility information for the UE 115-*d*. For example, the wireless node 305 may determine mobility information indicating a location of the UE 115-*d*, a direction of the UE 115-*d*, a speed of the UE 115-*d* or any combination thereof. Additionally, or alternatively, the wireless node 305 may utilize prediction techniques to determine whether the UE 115-*d* is exiting a coverage area, getting closer to a cell, moving away from a cell center, or any combination thereof. In some examples, the UE 115-*e* may receive the reference signals and forward them, or may transmit mobility information, to the wireless node 305. The wireless node may use the received reference signal to perform CSI measurement for the UE 115-*d*. In some examples, the wireless node 305 may configure the radios of UE 115-*d*. Both the MR 220 and the LP-WUR 225 may be configured using L1/L2/L3 signaling. The configuration may include power control adjustment. Based on determining the location or mobility information for the UE 115-*d*, the wireless node 305 may select a WUS type (e.g., LP-WUS, PDCCH-WUS) to send to the UE 115-*d*. The WUS selection may be based on the measurements performed on the reference signal received in step 315. The wireless node 305 may change the WUS selection over time.

In some examples, the wireless node 305 may provide configuration information to the UE 115-*d* and may transmit the wakeup signaling in 340 based on the configuration information. For example, at 320 the UE 115-*d* may receive an indication of a set of candidate UEs 115 before entering a sleep mode. Each UE 115 in the set of candidate UEs may be capable of transmitting wakeup signaling to the UE 115-*d*. The set of candidate UEs 115 may include the UE 115-*e*. Based on receiving the indication, the UE 115-*d* may monitor the resources used by the UEs 115 during a low-power monitoring occasion to detect wakeup signaling. The UE 115-*d* may receive the indication either from the wireless node 305 or the UE 115-*e*.

In some examples, the wireless node 305 may support LP-WUS only, PDCCH-based wakeup signaling only, LP-SS signaling activated or deactivated, LP-RS signaling activated or deactivated, or any combination thereof, based on a network power saving mode (e.g., based on a power state at the wireless node 305). In some examples, the wireless node 305 may send an indication of a current mode of operation to the UE 115-*d*. The wireless node 305 may select a mode of operation based on the current power state of the wireless node 305. The indication of a mode of operation may include an indication of what type of WUS (e.g., LP-WUS or PDCCH-WUS) is currently supported by the wireless node 305. Additionally, the indication may also include an indication of whether the wireless node 305 supports LP-RS and LP-SS, a duration until the wireless node 305 switches to another mode of operation, an indication of the next mode of operation, or any combination thereof. The wireless node 305 may send the indication to the UE 115-*d* using L1, L2, or L3 signaling (e.g., in a msg2, a msg4, a msgB, or in a master information block (MIB), a system information block (SIB). In some examples, the wireless node 305 may transmit the indication of the current of subsequent mode periodically or aperiodically.

In some examples, the wireless node 305 may transmit the wakeup signaling at 340 for relaying to the UE 115-*d* based on a location of the UE 115-*d*. For example, at 325, the wireless node 305 may indicate to the UE 115-*d* a configuration table. The configuration table may include a location, threshold distance from the wireless node 305, reference signal resource pools (RSRPs), pathloss, and coverage for multiple LP-WUS configurations (e.g., repetition, periodicity, waveforms, modulation and coding schemes, or a combination thereof).

At 330, the UE 115-*d* may indicate location information to the wireless node 305. For example, the UE 115-*d* may send a request for a certain low-power signal configuration to the wireless node 305 based on receiving the indication of a configuration table. The UE 115-*d* may determine the low-power signal configuration to use based on the location of the UE 115-*d*. For example, the UE 115-*d* may select a specific configuration based on the UE 115-*d* satisfying a threshold distance of the configuration table. Additionally, or alternatively, the UE 115-*d* may indicate to the wireless node 305 that the UE 115-*d* is leaving a coverage area associated with LP-WUS and is entering a coverage area associated with PDCCH-WUS. In some examples, the wireless node 305 may refrain from transmitting the wakeup signaling at 340 based on an indication that the UE 115-*d* has entered a coverage area associated with PDCCH-WUS or may transmit the wakeup signaling at 340 based on the indication that the UE 115-*d* has left a coverage area associated with PDCCH-WUS.

Figure 4:
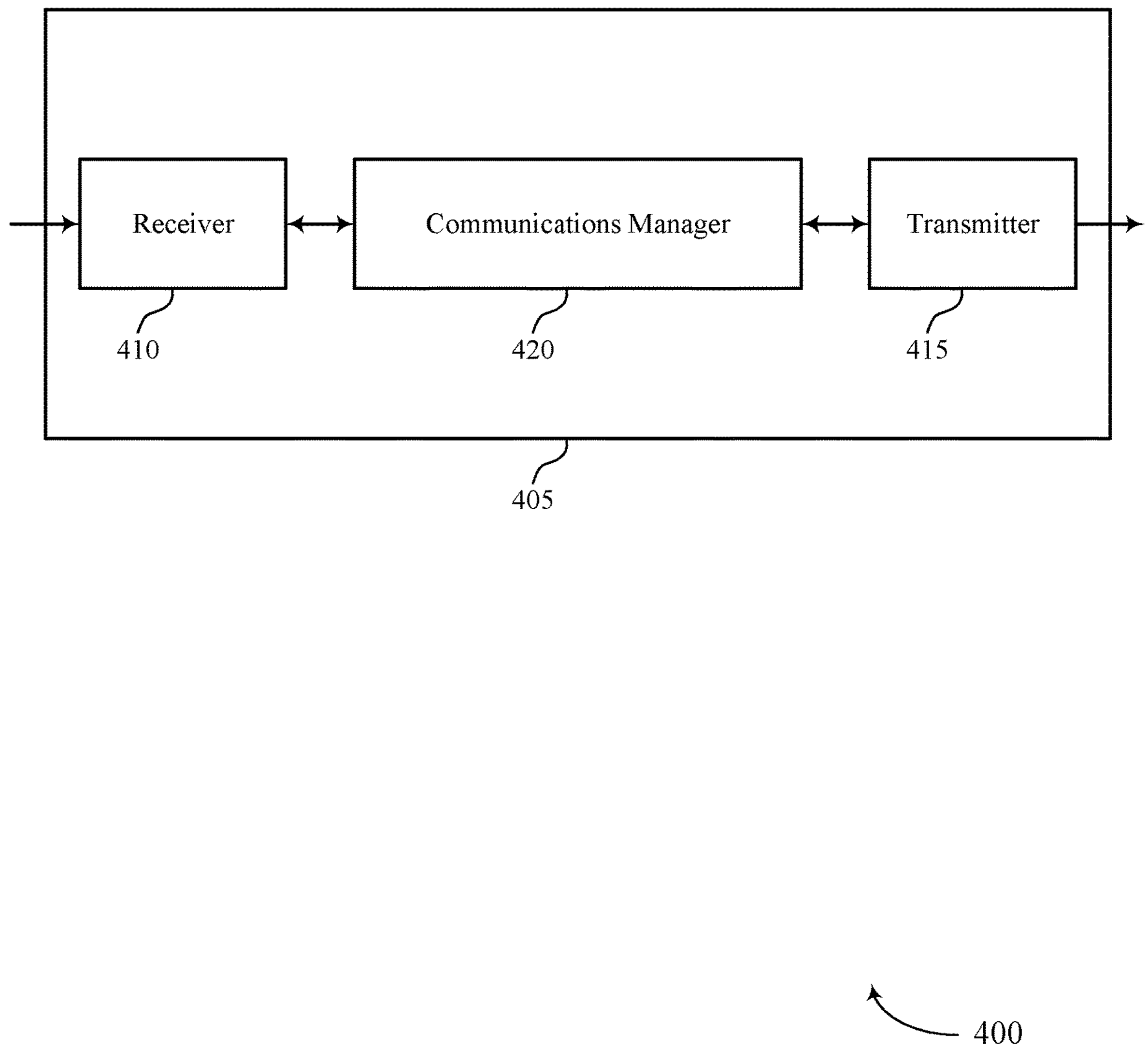
FIGS. 4 and 5 illustrate block diagrams of devices that support low-power wakeup radio signaling in wireless communications in accordance with one or more aspects of the present disclosure.

FIG. 4 illustrates a block diagram 400 of a device 405 that supports low-power wakeup radio signaling in wireless communications in accordance with one or more aspects of the present disclosure. The device 405 may be an example of aspects of a UE 115 as described herein. The device 405 may include a receiver 410, a transmitter 415, and a communications manager 420. The device 405 may also include at least one processor. Each of these components may be in communication with one another (e.g., via one or more buses).

The receiver 410 may provide a means for receiving information such as packets, user data, control information, or any combination thereof associated with various information channels (e.g., control channels, data channels, information channels related to low-power wakeup radio signaling in wireless communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to low-power wakeup radio signaling in wireless communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of low-power wakeup radio signaling in wireless communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include at least one processor, at least one digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., the memory storing instructions for the at least one processor).

Additionally, or alternatively, in some examples, the communications manager 420, the receiver 410, the transmitter 415, or various combinations or components thereof may be implemented in code (e.g., as communications management software) executed by at least one processor. If implemented in code executed by at least one processor, the functions of the communications manager 420, the receiver 410, the transmitter 415, or various combinations or components thereof may be performed by at least one general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 may be configured as or otherwise support a means for transmitting, by a first UE, capability information indicating that the first UE is capable of relaying wakeup signaling from a wireless device to a second UE associated with a wakeup radio. The communications manager 420 may be configured as or otherwise support a means for receiving the wakeup signaling from the wireless device based on transmitting the capability information. The communications manager 420 may be configured as or otherwise support a means for transmitting the wakeup signaling to the wakeup radio of the second UE.

Additionally, or alternatively, the communications manager 420 may support wireless communications in accordance with examples as disclosed herein. For example, the communications manager 420 may be configured as or otherwise support a means for receiving control signaling including one or more parameters for receiving wakeup signaling from a first UE by a second UE associated with a wakeup radio. The communications manager 420 may be configured as or otherwise support a means for monitoring for the wakeup signaling according to the one or more parameters. The communications manager 420 may be configured as or otherwise support a means for receiving the wakeup signaling from a wireless device via the first UE based on the monitoring.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced power consumption.

Figure 5:
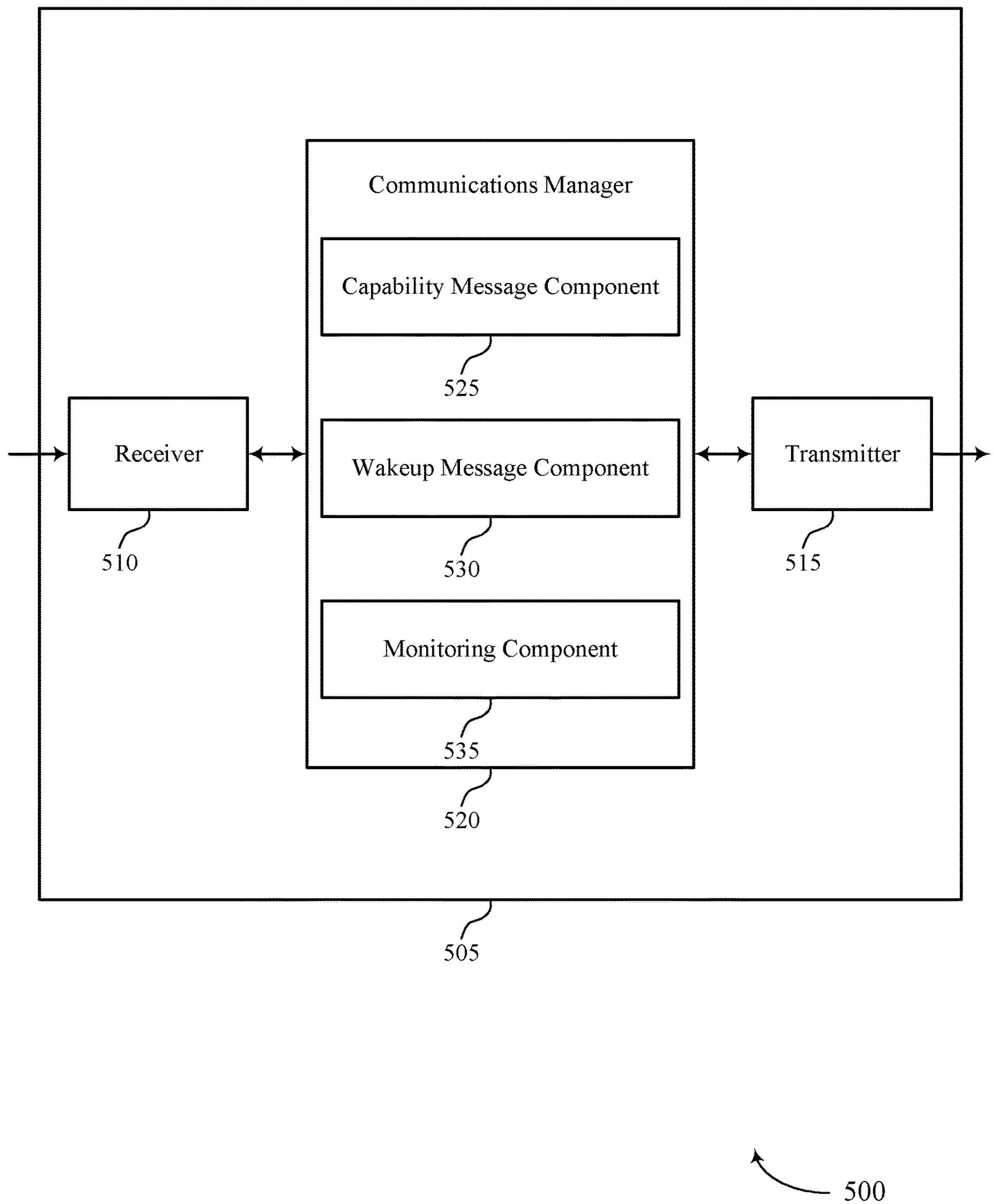

FIG. 5 illustrates a block diagram 500 of a device 505 that supports low-power wakeup radio signaling in wireless communications in accordance with one or more aspects of the present disclosure. The device 505 may be an example of aspects of a device 405 or a UE 115 as described herein. The device 505 may include a receiver 510, a transmitter 515, and a communications manager 520. The device 505 may also include at least one processor. Each of these components may be in communication with one another (e.g., via one or more buses).

The receiver 510 may provide a means for receiving information such as packets, user data, control information, or any combination thereof associated with various information channels (e.g., control channels, data channels, information channels related to low-power wakeup radio signaling in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to low-power wakeup radio signaling in wireless communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of low-power wakeup radio signaling in wireless communications as described herein. For example, the communications manager 520 may include a capability message component 525, a wakeup message component 530, a monitoring component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The capability message component 525 may be configured as or otherwise support a means for transmitting, by a first UE, capability information indicating that the first UE is capable of relaying wakeup signaling from a wireless device to a second UE associated with a wakeup radio. The wakeup message component 530 may be configured as or otherwise support a means for receiving the wakeup signaling from the wireless device based on transmitting the capability information. The wakeup message component 530 may be configured as or otherwise support a means for transmitting the wakeup signaling to the wakeup radio of the second UE.

Additionally, or alternatively, the communications manager 520 may support wireless communications in accordance with examples as disclosed herein. The capability message component 525 may be configured as or otherwise support a means for receiving control signaling including one or more parameters for receiving wakeup signaling from a first UE by a second UE associated with a wakeup radio. The monitoring component 535 may be configured as or otherwise support a means for monitoring for the wakeup signaling according to the one or more parameters. The monitoring component 535 may be configured as or otherwise support a means for receiving the wakeup signaling from a wireless device via the first UE based on the monitoring.

Figure 6:
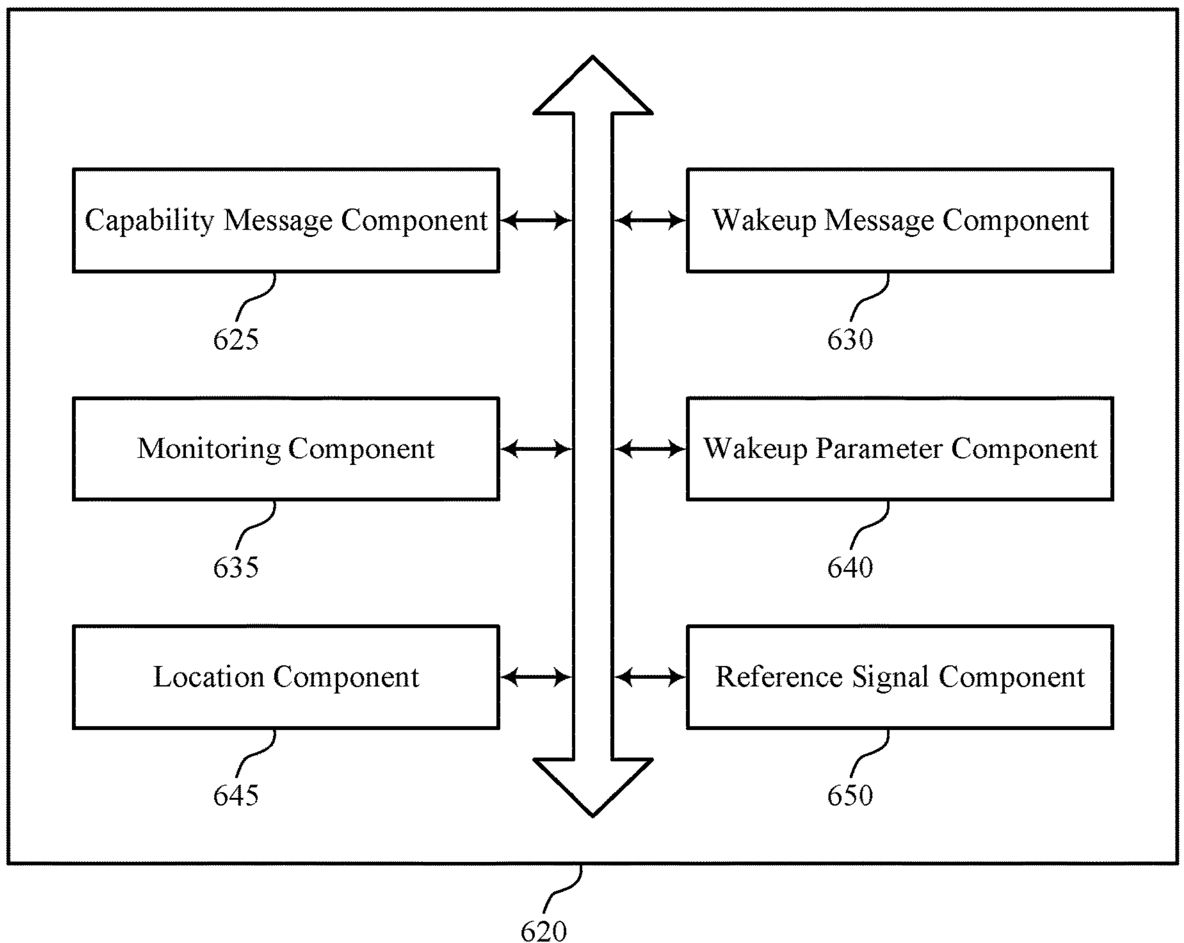
FIG. 6 illustrates a block diagram of a communications manager that supports low-power wakeup radio signaling in wireless communications in accordance with one or more aspects of the present disclosure.

FIG. 6 illustrates a block diagram 600 of a communications manager 620 that supports low-power wakeup radio signaling in wireless communications in accordance with one or more aspects of the present disclosure. The communications manager 620 may be an example of aspects of a communications manager 420, a communications manager 520, or both, as described herein. The communications manager 620, or various components thereof, may be an example of means for performing various aspects of low-power wakeup radio signaling in wireless communications as described herein. For example, the communications manager 620 may include a capability message component 625, a wakeup message component 630, a monitoring component 635, a wakeup parameter component 640, a location component 645, a reference signal component 650, or any combination thereof. Each of these components may communicate, directly or indirectly, with one another (e.g., via one or more buses).

The communications manager 620 may support wireless communications in accordance with examples as disclosed herein. The capability message component 625 may be configured as or otherwise support a means for transmitting, by a first UE, capability information indicating that the first UE is capable of relaying wakeup signaling from a wireless device to a second UE associated with a wakeup radio. The wakeup message component 630 may be configured as or otherwise support a means for receiving the wakeup signaling from the wireless device based on transmitting the capability information. In some examples, the wakeup message component 630 may be configured as or otherwise support a means for transmitting the wakeup signaling to the wakeup radio of the second UE.

In some examples, the wakeup parameter component 640 may be configured as or otherwise support a means for receiving one or more parameters for transmitting the wakeup signaling to the second UE, the one or more parameters including a repetition factor, a transmit power, a periodicity, a waveform, a modulation and coding scheme, or any combination thereof, where transmitting the wakeup signaling is based on the one or more parameters.

In some examples, the wakeup parameter component 640 may be configured as or otherwise support a means for receiving a request to update the one or more parameters from the second UE based at least in part on an indication in the capability information that the first UE is capable of receiving wakeup radio signaling from the second UE.

In some examples, the wakeup parameter component 640 may be configured as or otherwise support a means for receiving an update of the one or more parameters from the wireless device based on an indication in the capability information that the first UE is not capable of receiving wakeup radio signaling from the second UE, where the wireless device includes a network entity.

In some examples, the capability message component 625 may be configured as or otherwise support a means for transmitting, via the capability information, an indication of one or more wakeup message types that the first UE is capable of transmitting, the one or more wakeup message types including a wakeup signal, a wakeup reference signal, a synchronization signal, or any combination thereof, where transmitting the wakeup signaling includes transmitting one of the wakeup message types transmitted via the capability information.

In some examples, to support transmitting the wakeup signaling, the wakeup message component 630 may be configured as or otherwise support a means for transmitting the wakeup signaling to a wakeup radio of the second UE indicating that the second UE is to wake up a main radio of the second UE for wireless communications via a first radio access technology of a set of multiple radio access technologies supported by the second UE, where the wakeup signaling includes a first waveform of a set of multiple waveforms corresponding to respective radio access technologies of the set of multiple radio access technologies, or is transmitted via a first set of resources of a set of multiple sets of resources corresponding to respective radio access technologies of the set of multiple radio access technologies.

In some examples, the capability message component 625 may be configured as or otherwise support a means for transmitting, via the capability information, an indication that the first UE is capable of supporting a wakeup radio, or both a wakeup radio and a main radio, for a set of frequency resources, an indication of one or more candidate parameters for the wakeup signaling corresponding to the wakeup radio, the main radio, or both, or any combination thereof.

In some examples, the location component 645 may be configured as or otherwise support a means for transmitting, to the second UE, an indication of a threshold distance from the wireless device corresponding to wakeup signaling, where receiving the wakeup signaling from the wireless device is based on a location of the second UE satisfying the threshold distance.

In some examples, to support transmitting the capability information, the capability message component 625 may be configured as or otherwise support a means for transmitting an initial registration message, a random access message, a radio resource control message, or any combination thereof, to the wireless device, where the wireless device includes a network entity.

In some examples, to support transmitting the capability information, the capability message component 625 may be configured as or otherwise support a means for transmitting a sidelink control information message, a sidelink radio resource control message, or any combination thereof, to the wireless device, where the wireless device includes a primary sidelink UE.

In some examples, transmitting the capability information is based on a power level or charging rate at the first UE satisfying a threshold.

Additionally, or alternatively, the communications manager 620 may support wireless communications in accordance with examples as disclosed herein. In some examples, the capability message component 625 may be configured as or otherwise support a means for receiving control signaling including one or more parameters for receiving wakeup signaling from a first UE by a second UE associated with a wakeup radio. The monitoring component 635 may be configured as or otherwise support a means for monitoring for the wakeup signaling according to the one or more parameters. In some examples, the monitoring component 635 may be configured as or otherwise support a means for receiving the wakeup signaling from a wireless device via the first UE based on the monitoring.

In some examples, the one or more parameters include a repetition factor, a transmit power, a periodicity, a waveform, a modulation and coding scheme, or any combination thereof. In some examples, receiving the wakeup signaling is based on the one or more parameters.

In some examples, the wakeup parameter component 640 may be configured as or otherwise support a means for transmitting, to the wireless device or the first UE, a request for the one or more parameters prior to entering a sleep mode, where receiving the one or more parameters is based on transmitting the request.

In some examples, to support transmitting the request for the one or more parameters, the wakeup parameter component 640 may be configured as or otherwise support a means for transmitting an indication of one or more candidate parameters including the one or more parameters based on a current location of the second UE, a power state of the second UE, a charging rate profile at the second UE, or any combination thereof.

In some examples, the wakeup parameter component 640 may be configured as or otherwise support a means for transmitting, to the wireless device or the first UE, a request to update the one or more parameters. In some examples, the wakeup parameter component 640 may be configured as or otherwise support a means for receiving, from the wireless device or the first UE, an update of the one or more parameters based on transmitting the request. In some examples, the wakeup parameter component 640 may be configured as or otherwise support a means for receiving additional wakeup signaling from the first UE according to the update of the one or more parameters.

In some examples, to support receiving the wakeup signaling, the wakeup message component 630 may be configured as or otherwise support a means for receiving the wakeup signaling using the wakeup radio of the second UE, the wakeup signaling indicating that the second UE is to wake up a main radio of the second UE for wireless communications via a first radio access technology of a set of multiple radio access technologies supported by the second UE, where the wakeup signaling includes a first waveform of a set of multiple waveforms corresponding to respective radio access technologies of the set of multiple radio access technologies, or is transmitted via a first set of resources of a set of multiple sets of resources corresponding to respective radio access technologies of the set of multiple radio access technologies.

In some examples, the one or more parameters include an indication of the set of multiple radio access technologies, the set of multiple sets of resources, the set of multiple waveforms, or any combination thereof.

In some examples, the monitoring component 635 may be configured as or otherwise support a means for receiving, from the wireless device or the first UE, an indication of a set of candidate UEs including the first UE, each of the set of candidate UEs being capable of relaying wakeup signaling to the second UE, where the monitoring is based on the indication of the set of candidate UEs.

In some examples, the capability message component 625 may be configured as or otherwise support a means for transmitting capability information indicating that the second UE is capable of receiving wireless signaling via the wakeup radio, or both the wakeup radio and a main radio, for a set of frequency resources, the capability information further including an indication of one or more candidate parameters for the wakeup signaling corresponding to the wakeup radio, the main radio, or both, or any combination thereof.

In some examples, the reference signal component 650 may be configured as or otherwise support a means for transmitting one or more reference signals to the wireless device prior to entering a sleep mode, the wireless device including a network entity, where receiving the wakeup signaling from the wireless device via the first UE is based on transmitting the one or more reference signals.

In some examples, the location component 645 may be configured as or otherwise support a means for transmitting, to the wireless device, mobility information indicating a location of the second UE, a direction of the second UE, a speed of the second UE, an indication that the second UE is exiting a coverage area, or any combination thereof, where receiving the wakeup signaling from the wireless device via the first UE is based on transmitting the mobility information.

In some examples, the wireless device includes a network entity or a sidelink UE.

Figure 7:
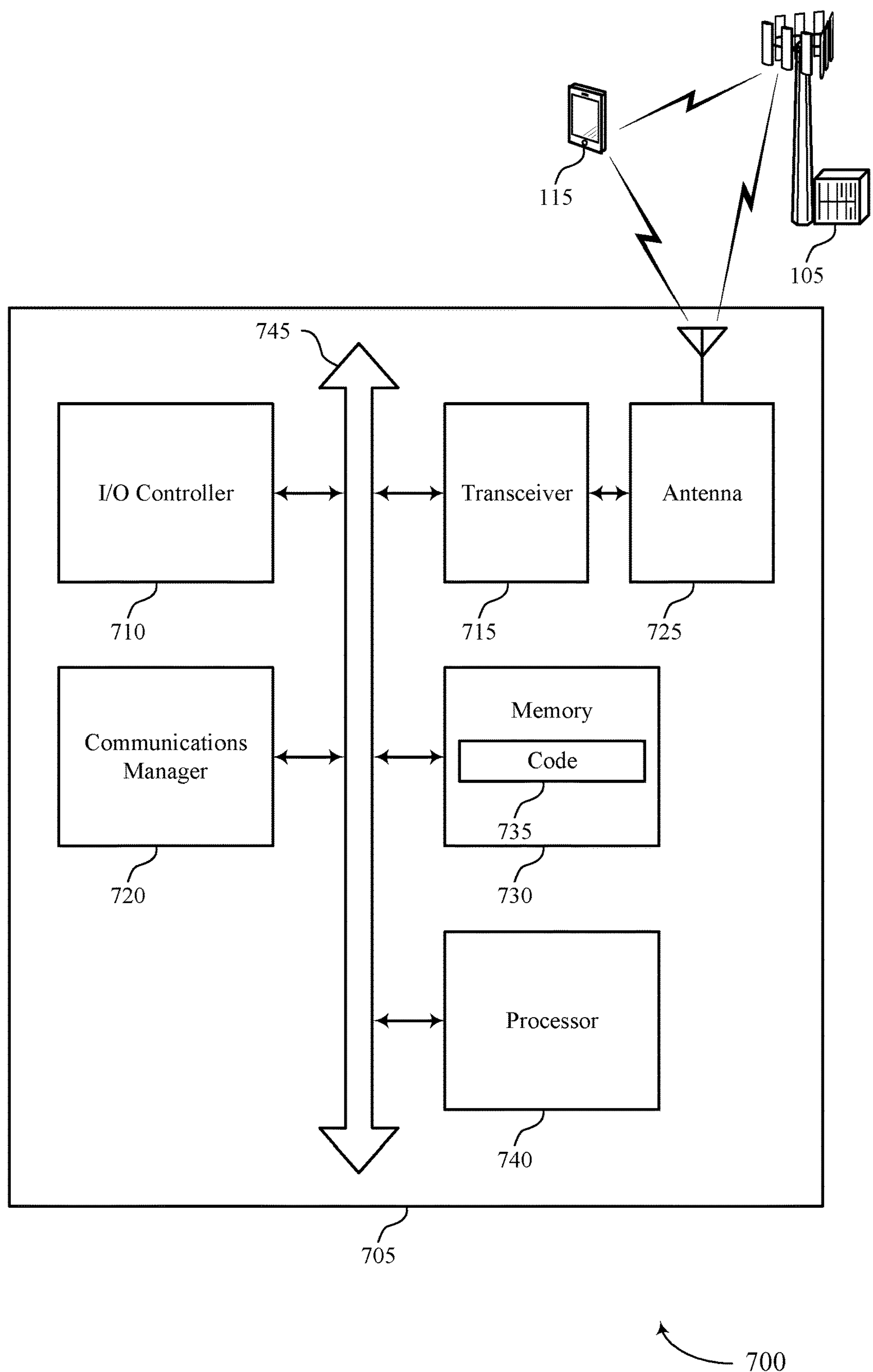
FIG. 7 illustrates a diagram of a system including a device that supports low-power wakeup radio signaling in wireless communications in accordance with one or more aspects of the present disclosure.

FIG. 7 illustrates a diagram of a system 700 including a device 705 that supports low-power wakeup radio signaling in wireless communications in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of at least one processor, such as the at processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The at least one processor 740 may include a hardware device (e.g., at least one general-purpose processor, a DSP, a CPU, a GPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into and coupled with the at least one processor 740. The at least one processor 740 may be configured to execute computer-readable instructions stored in a memory (e.g., the memory 730) to cause the device 705 to perform various functions (e.g., functions or tasks supporting low-power wakeup radio signaling in wireless communications). For example, the device 705 or a component of the device 705 may include at least one processor 740 and memory 730 coupled with or to the at least one processor 740, the at least one processor 740 and memory 730 configured to perform various functions described herein.

The communications manager 720 may support wireless communications in accordance with examples as disclosed herein. For example, the communications manager 720 may be configured as or otherwise support a means for transmitting, by a first UE, capability information indicating that the first UE is capable of relaying wakeup signaling from a wireless device to a second UE associated with a wakeup radio. The communications manager 720 may be configured as or otherwise support a means for receiving the wakeup signaling from the wireless device based on transmitting the capability information. The communications manager 720 may be configured as or otherwise support a means for transmitting the wakeup signaling to the wakeup radio of the second UE.

Additionally, or alternatively, the communications manager 720 may support wireless communications in accordance with examples as disclosed herein. For example, the communications manager 720 may be configured as or otherwise support a means for receiving control signaling including one or more parameters for receiving wakeup signaling from a first UE by a second UE associated with a wakeup radio. The communications manager 720 may be configured as or otherwise support a means for monitoring for the wakeup signaling according to the one or more parameters. The communications manager 720 may be configured as or otherwise support a means for receiving the wakeup signaling from a wireless device via the first UE based on the monitoring.

By including or configuring the communications manager 720 in accordance with examples as described herein, the device 705 may support techniques for reduced power consumption, longer battery life, reduced latency, and improved communication reliability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the memory 730, the code 735, or any combination thereof. For example, the code 735 may include instructions executable by the at least one processor 740 (e.g., directly, indirectly, after pre-processing or compiling, without pre-processing or compiling) to cause the device 705 to perform various aspects of low-power wakeup radio signaling in wireless communications as described herein, or the at least one processor 740 and the memory 730 may be otherwise configured to perform or support such operations.

Figure 8:
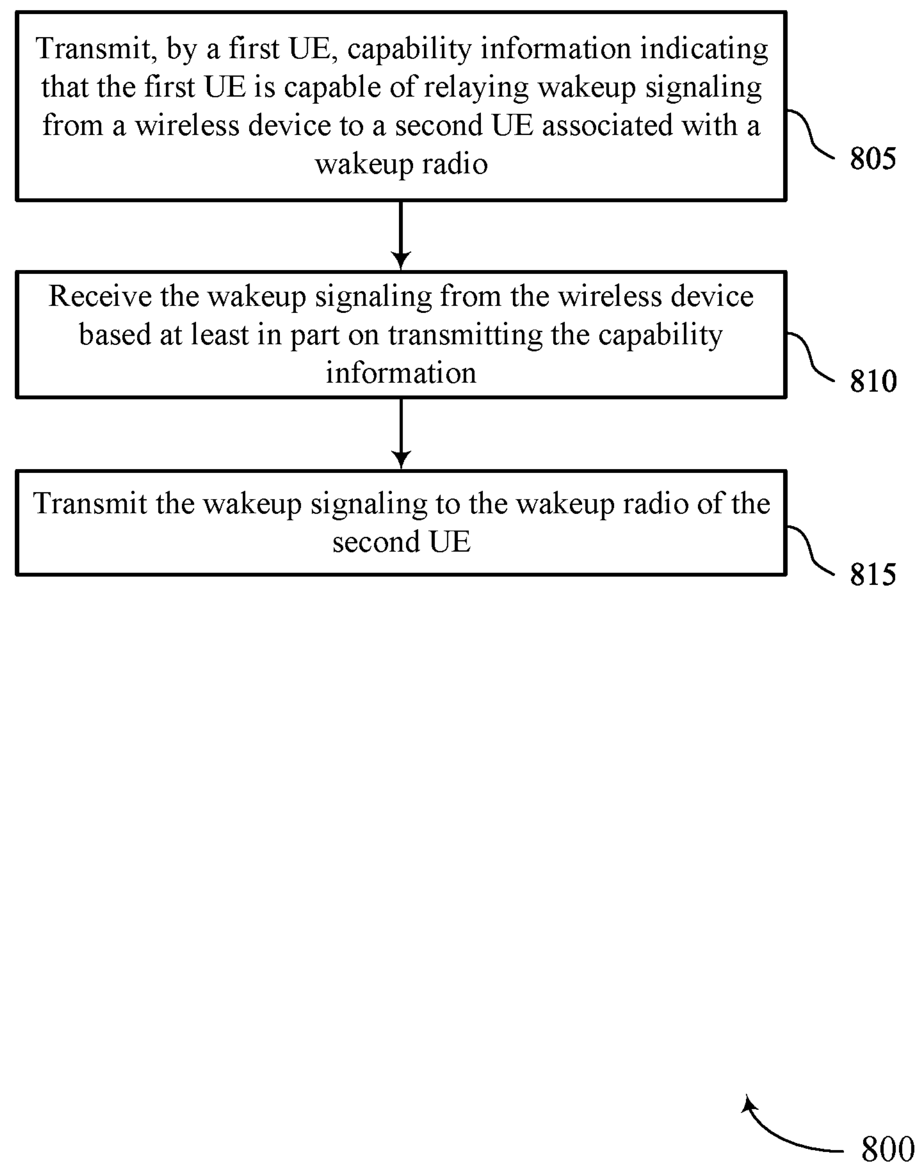
FIGS. 8 through 12 illustrate flowcharts showing methods that support low-power wakeup radio signaling in wireless communications in accordance with one or more aspects of the present disclosure.

FIG. 8 illustrates a flowchart showing a method 800 that supports low-power wakeup radio signaling in wireless communications in accordance with one or more aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include transmitting, by a first UE, capability information indicating that the first UE is capable of relaying wakeup signaling from a wireless device to a second UE associated with a wakeup radio. The operations of 805 may be performed in accordance with examples as disclosed herein. In some examples, aspects of the operations of 805 may be performed by a capability message component 625 as described with reference to FIG. 6.

At 810, the method may include receiving the wakeup signaling from the wireless device based at least in part on transmitting the capability information. The operations of 810 may be performed in accordance with examples as disclosed herein. In some examples, aspects of the operations of 810 may be performed by a wakeup message component 630 as described with reference to FIG. 6.

At 815, the method may include transmitting the wakeup signaling to the wakeup radio of the second UE. The operations of 815 may be performed in accordance with examples as disclosed herein. In some examples, aspects of the operations of 815 may be performed by a wakeup message component 630 as described with reference to FIG. 6.

Figure 9:
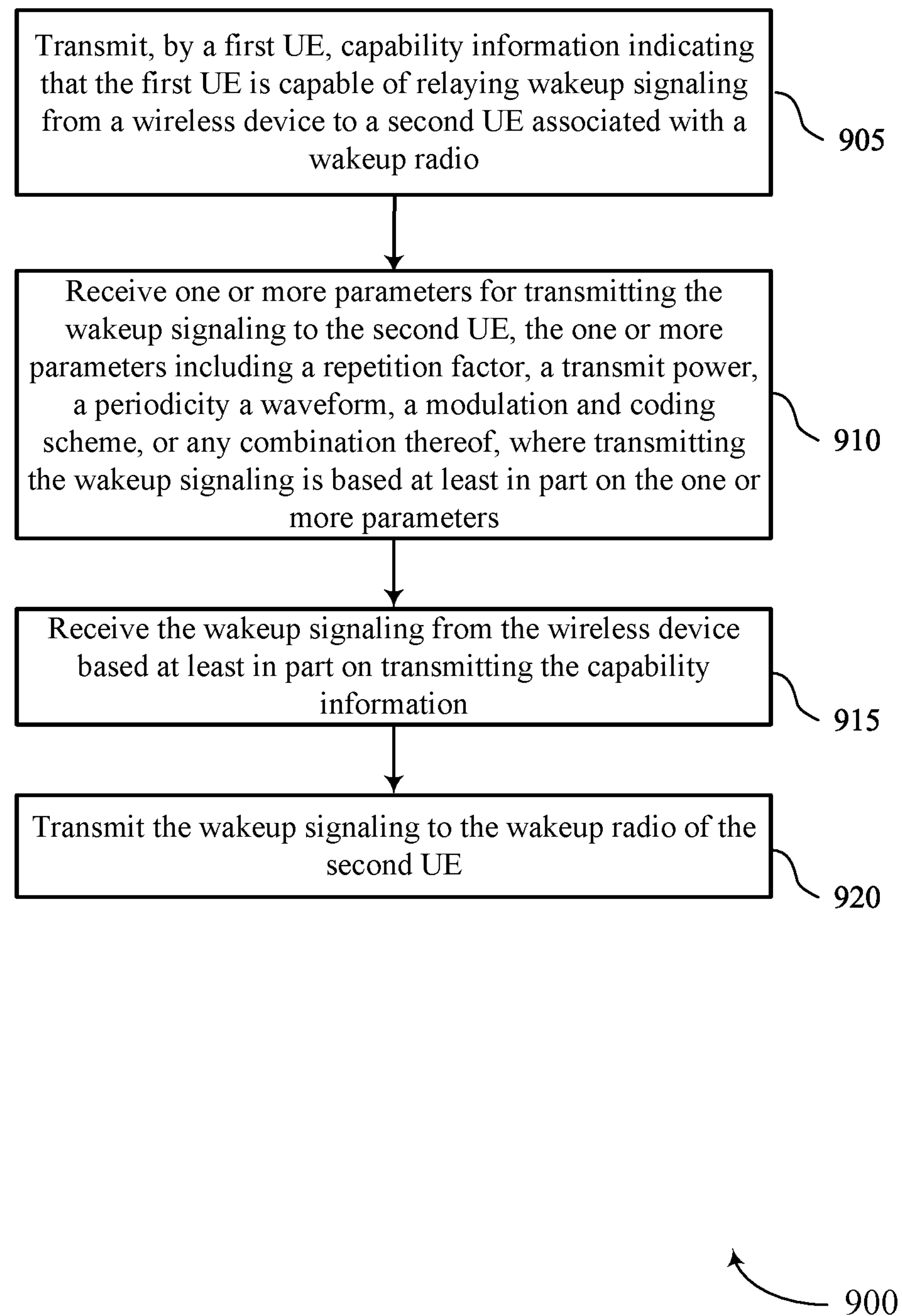

FIG. 9 illustrates a flowchart showing a method 900 that supports low-power wakeup radio signaling in wireless communications in accordance with one or more aspects of the present disclosure. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 905, the method may include transmitting, by a first UE, capability information indicating that the first UE is capable of relaying wakeup signaling from a wireless device to a second UE associated with a wakeup radio. The operations of 905 may be performed in accordance with examples as disclosed herein. In some examples, aspects of the operations of 905 may be performed by a capability message component 625 as described with reference to FIG. 6.

At 910, the method may include receiving one or more parameters for transmitting the wakeup signaling to the second UE, the one or more parameters including a repetition factor, a transmit power, a periodicity, a waveform, a modulation and coding scheme, or any combination thereof, where transmitting the wakeup signaling is based at least in part on the one or more parameters. The operations of 910 may be performed in accordance with examples as disclosed herein. In some examples, aspects of the operations of 910 may be performed by a wakeup parameter component 640 as described with reference to FIG. 6.

At 915, the method may include receiving the wakeup signaling from the wireless device based at least in part on transmitting the capability information. The operations of 915 may be performed in accordance with examples as disclosed herein. In some examples, aspects of the operations of 915 may be performed by a wakeup message component 630 as described with reference to FIG. 6.

At 920, the method may include transmitting the wakeup signaling to the wakeup radio of the second UE. The operations of 920 may be performed in accordance with examples as disclosed herein. In some examples, aspects of the operations of 920 may be performed by a wakeup message component 630 as described with reference to FIG. 6.

Figure 10:
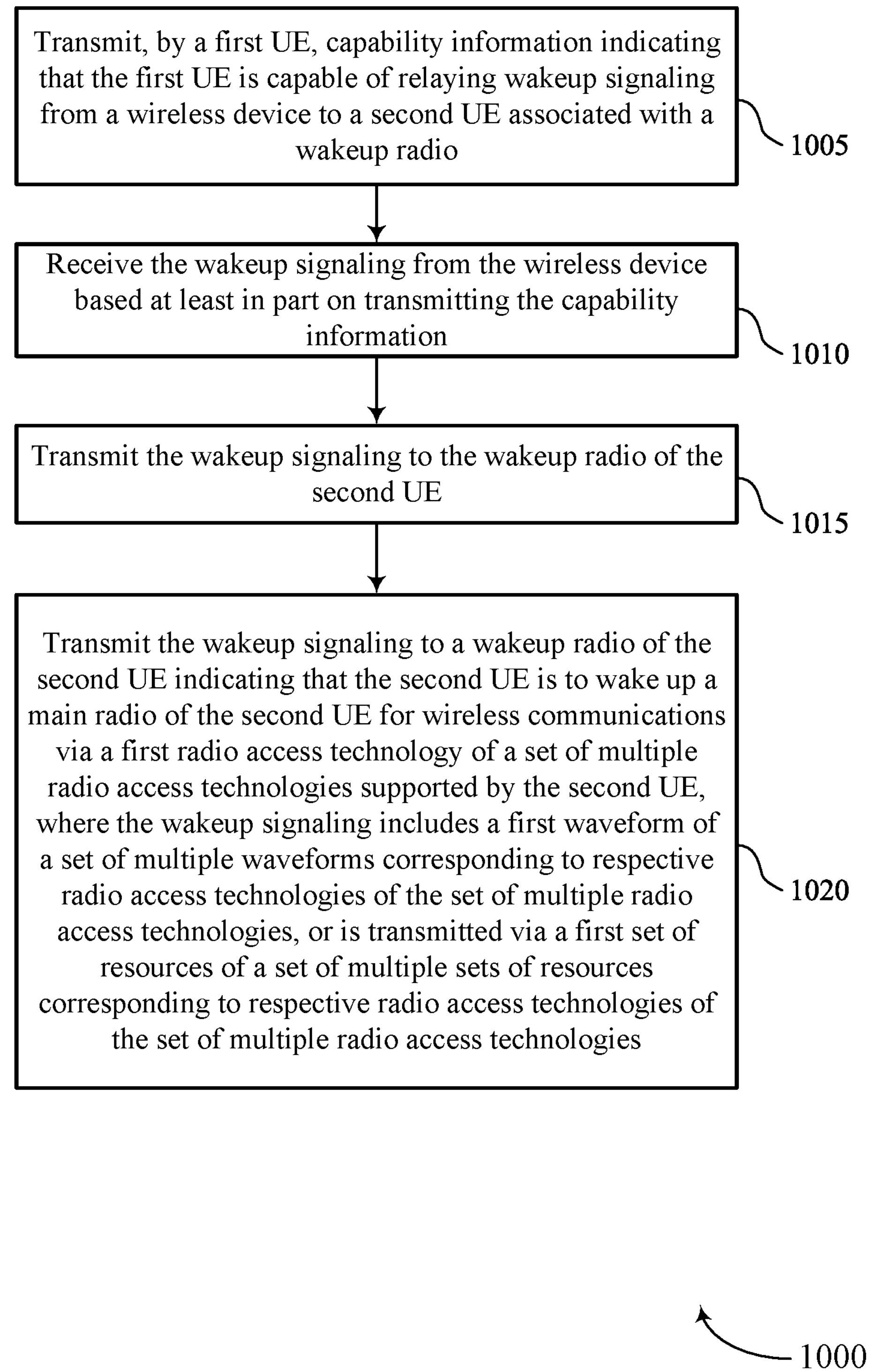

FIG. 10 illustrates a flowchart showing a method 1000 that supports low-power wakeup radio signaling in wireless communications in accordance with one or more aspects of the present disclosure. The operations of the method 1000 may be implemented by a UE or its components as described herein. For example, the operations of the method 1000 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1005, the method may include transmitting, by a first UE, capability information indicating that the first UE is capable of relaying wakeup signaling from a wireless device to a second UE associated with a wakeup radio. The operations of 1005 may be performed in accordance with examples as disclosed herein. In some examples, aspects of the operations of 1005 may be performed by a capability message component 625 as described with reference to FIG. 6.

At 1010, the method may include receiving the wakeup signaling from the wireless device based at least in part on transmitting the capability information. The operations of 1010 may be performed in accordance with examples as disclosed herein. In some examples, aspects of the operations of 1010 may be performed by a wakeup message component 630 as described with reference to FIG. 6.

At 1015, the method may include transmitting the wakeup signaling to the wakeup radio of the second UE. The operations of 1015 may be performed in accordance with examples as disclosed herein. In some examples, aspects of the operations of 1015 may be performed by a wakeup message component 630 as described with reference to FIG. 6.

At 1020, the method may include transmitting the wakeup signaling to a wakeup radio of the second UE indicating that the second UE is to wake up a main radio of the second UE for wireless communications via a first radio access technology of a set of multiple radio access technologies supported by the second UE, where the wakeup signaling includes a first waveform of a set of multiple waveforms corresponding to respective radio access technologies of the set of multiple radio access technologies, or is transmitted via a first set of resources of a set of multiple sets of resources corresponding to respective radio access technologies of the set of multiple radio access technologies. The operations of 1020 may be performed in accordance with examples as disclosed herein. In some examples, aspects of the operations of 1020 may be performed by a wakeup message component 630 as described with reference to FIG. 6.

Figure 11:
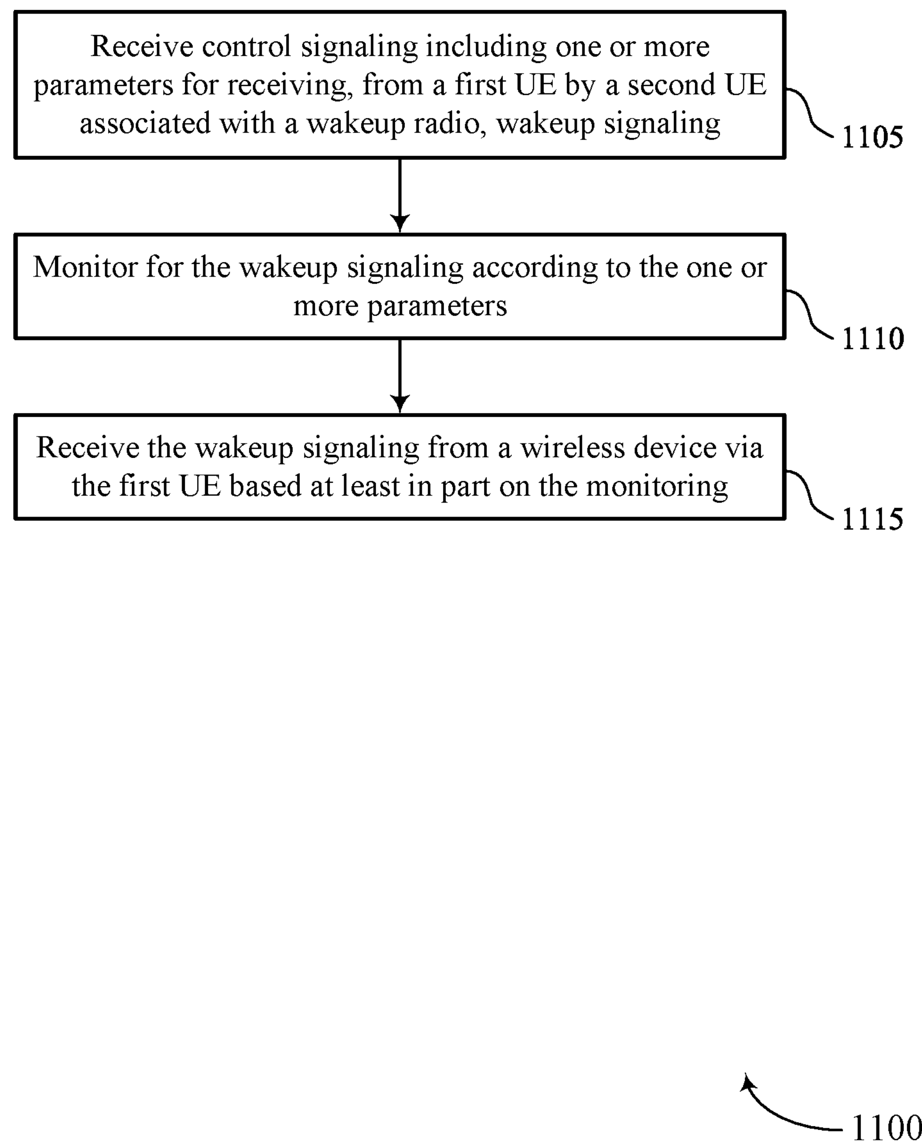

FIG. 11 illustrates a flowchart showing a method 1100 that supports low-power wakeup radio signaling in wireless communications in accordance with one or more aspects of the present disclosure. The operations of the method 1100 may be implemented by a UE or its components as described herein. For example, the operations of the method 1100 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1105, the method may include receiving control signaling including one or more parameters for receiving wakeup signaling from a first UE by a second UE associated with a wakeup radio. The operations of 1105 may be performed in accordance with examples as disclosed herein. In some examples, aspects of the operations of 1105 may be performed by a capability message component 625 as described with reference to FIG. 6.

At 1110, the method may include monitoring for the wakeup signaling according to the one or more parameters. The operations of 1110 may be performed in accordance with examples as disclosed herein. In some examples, aspects of the operations of 1110 may be performed by a monitoring component 635 as described with reference to FIG. 6.

At 1115, the method may include receiving the wakeup signaling from a wireless device via the first UE based at least in part on the monitoring. The operations of 1115 may be performed in accordance with examples as disclosed herein. In some examples, aspects of the operations of 1115 may be performed by a monitoring component 635 as described with reference to FIG. 6.

Figure 12:
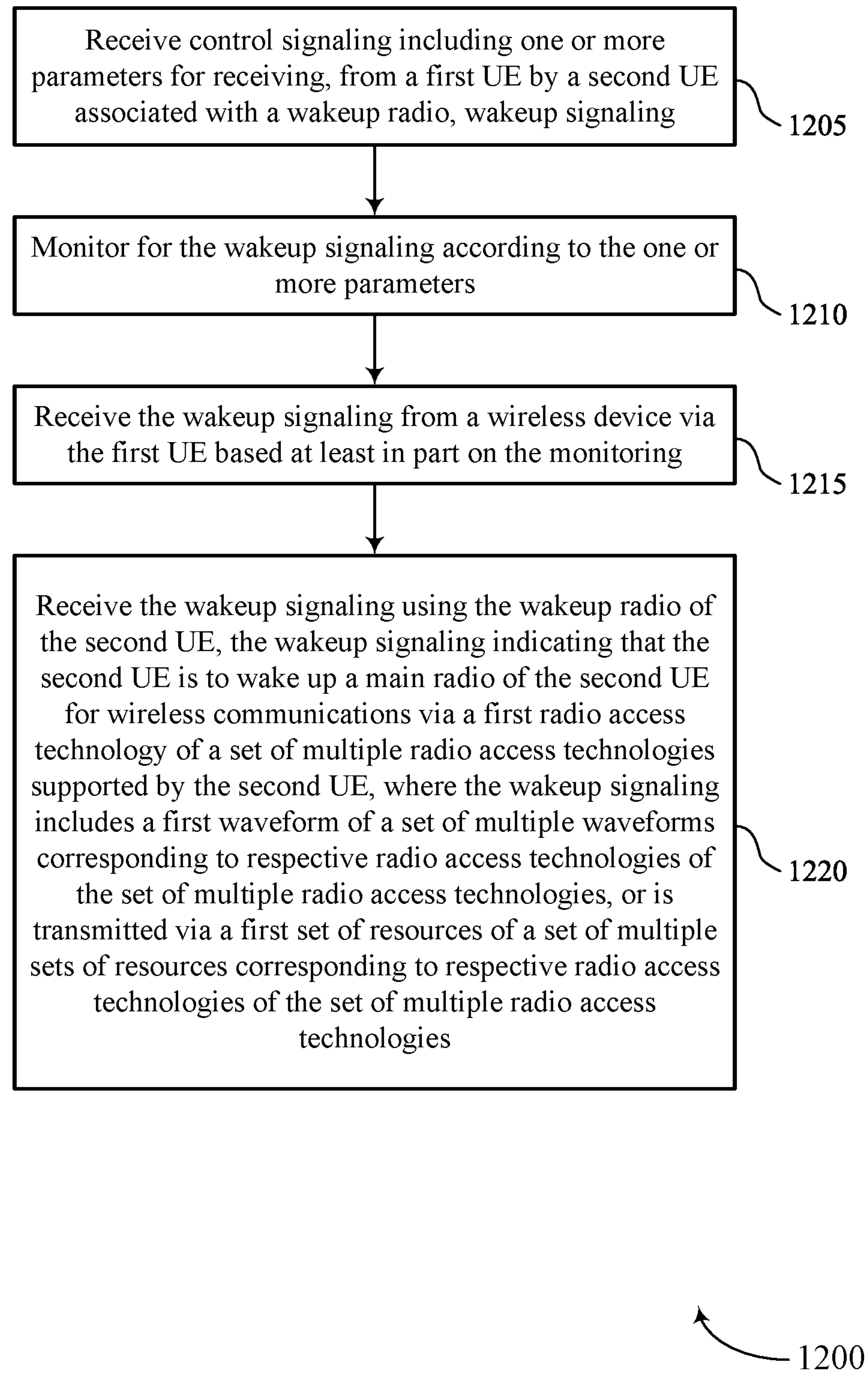

FIG. 12 illustrates a flowchart showing a method 1200 that supports low-power wakeup radio signaling in wireless communications in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving control signaling including one or more parameters for receiving wakeup signaling from a first UE by a second UE associated with a wakeup radio. The operations of 1205 may be performed in accordance with examples as disclosed herein. In some examples, aspects of the operations of 1205 may be performed by a capability message component 625 as described with reference to FIG. 6.

At 1210, the method may include monitoring for the wakeup signaling according to the one or more parameters. The operations of 1210 may be performed in accordance with examples as disclosed herein. In some examples, aspects of the operations of 1210 may be performed by a monitoring component 635 as described with reference to FIG. 6.

At 1215, the method may include receiving the wakeup signaling from a wireless device via the first UE based at least in part on the monitoring. The operations of 1215 may be performed in accordance with examples as disclosed herein. In some examples, aspects of the operations of 1215 may be performed by a monitoring component 635 as described with reference to FIG. 6.

At 1220, the method may include receiving the wakeup signaling using the wakeup radio of the second UE, the wakeup signaling indicating that the second UE is to wake up a main radio of the second UE for wireless communications via a first radio access technology of a set of multiple radio access technologies supported by the second UE, where the wakeup signaling includes a first waveform of a set of multiple waveforms corresponding to respective radio access technologies of the set of multiple radio access technologies, or is transmitted via a first set of resources of a set of multiple sets of resources corresponding to respective radio access technologies of the set of multiple radio access technologies. The operations of 1220 may be performed in accordance with examples as disclosed herein. In some examples, aspects of the operations of 1220 may be performed by a wakeup message component 630 as described with reference to FIG. 6.

The following provides an overview of aspects of the present disclosure:

Aspect 1: A method for wireless communications, comprising: transmitting, by a first UE, capability information indicating that the first UE is capable of relaying wakeup signaling from a wireless device to a second UE associated with a wakeup radio; receiving the wakeup signaling from the wireless device based at least in part on transmitting the capability information; and transmitting the wakeup signaling to the wakeup radio of the second UE.

Aspect 2: The method of aspect 1, further comprising: receiving one or more parameters for transmitting the wakeup signaling to the second UE, the one or more parameters comprising a repetition factor, a transmit power, a periodicity, a waveform, a modulation and coding scheme, or any combination thereof, wherein transmitting the wakeup signaling is based at least in part on the one or more parameters.

Aspect 3: The method of aspect 2, further comprising: receiving a request to update the one or more parameters from the second UE based at least in part on an indication in the capability information that the first UE is capable of receiving wakeup radio signaling from the second UE.

Aspect 4: The method of any of aspects 2 through 3, further comprising: receiving an update of the one or more parameters from the wireless device based at least in part on an indication in the capability information that the first UE is not capable of receiving wakeup radio signaling from the second UE, wherein the wireless device comprises a network entity.

Aspect 5: The method of any of aspects 1 through 4, further comprising: transmitting, via the capability information, an indication of one or more wakeup message types that the first UE is capable of transmitting, the one or more wakeup message types comprising a wakeup signal, a wakeup reference signal, a synchronization signal, or any combination thereof, wherein transmitting the wakeup signaling comprises transmitting one of the wakeup message types transmitted via the capability information.

Aspect 6: The method of any of aspects 1 through 5, wherein transmitting the wakeup signaling comprises: transmitting the wakeup signaling to a wakeup radio of the second UE indicating that the second UE is to wake up a main radio of the second UE for wireless communications via a first radio access technology of a plurality of radio access technologies supported by the second UE, wherein the wakeup signaling comprises a first waveform of a plurality of waveforms corresponding to respective radio access technologies of the plurality of radio access technologies, or is transmitted via a first set of resources of a plurality of sets of resources corresponding to respective radio access technologies of the plurality of radio access technologies.

Aspect 7: The method of any of aspects 1 through 6, further comprising: transmitting, via the capability information, an indication that the first UE is capable of supporting a wakeup radio, or both a wakeup radio and a main radio, for a set of frequency resources, an indication of one or more candidate parameters for the wakeup signaling corresponding to the wakeup radio, the main radio, or both, or any combination thereof.

Aspect 8: The method of any of aspects 1 through 7, further comprising: transmitting, to the second UE, an indication of a threshold distance from the wireless device corresponding to wakeup signaling, wherein receiving the wakeup signaling from the wireless device is based at least in part on a location of the second UE satisfying the threshold distance.

Aspect 9: The method of any of aspects 1 through 8, wherein transmitting the capability information comprises: transmitting an initial registration message, a random access message, a radio resource control message, or any combination thereof, to the wireless device, wherein the wireless device comprises a network entity.

Aspect 10: The method of any of aspects 1 through 9, wherein transmitting the capability information comprises: transmitting a sidelink control information message, a sidelink radio resource control message, or any combination thereof, to the wireless device, wherein the wireless device comprises a primary sidelink UE.

Aspect 11: The method of any of aspects 1 through 10, wherein transmitting the capability information is based at least in part on a power level or charging rate at the first UE satisfying a threshold.

Aspect 12: The method of any of aspects 1 through 11, further comprising: transmitting, via the capability information using a main radio or a wakeup radio of the first UE, an indication that the first UE supports a discontinuous reception operation.

Aspect 13: The method of aspect 12, further comprising: selecting a discontinuous reception cycle based at least in part on the indication that the first UE supports the discontinuous reception operation, wherein transmitting the wakeup signaling to the wakeup radio of the second UE is based at least in part on the discontinuous reception cycle.

Aspect 14: A method for wireless communications, comprising: receiving control signaling comprising one or more parameters for receiving wakeup signaling from a first UE by a second UE associated with a wakeup radio; monitoring for the wakeup signaling according to the one or more parameters; and receiving the wakeup signaling from a wireless device via the first UE based at least in part on the monitoring.

Aspect 15: The method of aspect 14, wherein the one or more parameters comprise a repetition factor, a transmit power, a periodicity, a waveform, a modulation and coding scheme, or any combination thereof, receiving the wakeup signaling is based at least in part on the one or more parameters.

Aspect 16: The method of aspect 15, further comprising: transmitting, to the wireless device or the first UE, a request for the one or more parameters prior to entering a sleep mode, wherein receiving the one or more parameters is based at least in part on transmitting the request.

Aspect 17: The method of aspect 16, wherein transmitting the request for the one or more parameters comprises: transmitting an indication of one or more candidate parameters comprising the one or more parameters based at least in part on a current location of the second UE, a power state of the second UE, a charging rate profile at the second UE, or any combination thereof.

Aspect 18: The method of any of aspects 15 through 17, further comprising: transmitting, to the wireless device or the first UE, a request to update the one or more parameters; receiving, from the wireless device or the first UE, an update of the one or more parameters based at least in part on transmitting the request; and receiving additional wakeup signaling from the first UE according to the update of the one or more parameters.

Aspect 19: The method of any of aspects 14 through 18, wherein receiving the wakeup signaling comprises: receiving the wakeup signaling using the wakeup radio of the second UE, the wakeup signaling indicating that the second UE is to wake up a main radio of the second UE for wireless communications via a first radio access technology of a plurality of radio access technologies supported by the second UE, wherein the wakeup signaling comprises a first waveform of a plurality of waveforms corresponding to respective radio access technologies of the plurality of radio access technologies, or is transmitted via a first set of resources of a plurality of sets of resources corresponding to respective radio access technologies of the plurality of radio access technologies.

Aspect 20: The method of aspect 19, wherein the one or more parameters comprise an indication of the plurality of radio access technologies, the plurality of sets of resources, the plurality of waveforms, or any combination thereof.

Aspect 21: The method of any of aspects 14 through 20, further comprising: receiving, from the wireless device or the first UE, an indication of a set of candidate UEs comprising the first UE, each of the set of candidate UEs being capable of relaying wakeup signaling to the second UE, wherein the monitoring is based at least in part on the indication of the set of candidate UEs.

Aspect 22: The method of any of aspects 14 through 21, further comprising: transmitting capability information indicating that the second UE is capable of receiving wireless signaling via the wakeup radio, or both the wakeup radio and a main radio, for a set of frequency resources, the capability information further comprising an indication of one or more candidate parameters for the wakeup signaling corresponding to the wakeup radio, the main radio, or both, or any combination thereof.

Aspect 23: The method of any of aspects 14 through 22, further comprising: transmitting one or more reference signals to the wireless device prior to entering a sleep mode, the wireless device comprising a network entity, wherein receiving the wakeup signaling from the wireless device via the first UE is based at least in part on transmitting the one or more reference signals.

Aspect 24: The method of any of aspects 14 through 23, further comprising: transmitting, to the wireless device, mobility information indicating a location of the second UE, a direction of the second UE, a speed of the second UE, an indication that the second UE is exiting a coverage area, or any combination thereof, wherein receiving the wakeup signaling from the wireless device via the first UE is based at least in part on transmitting the mobility information.

Aspect 25: The method of any of aspects 14 through 24, wherein the wireless device comprises a network entity or a sidelink UE.

Aspect 26: The method of any of aspects 14 through 25, further comprising: transmitting, using a main radio or a wakeup radio of the second UE, capability information comprising an indication that the second UE supports a discontinuous reception operation.

Aspect 27: The method of aspect 26, further comprising: selecting a discontinuous reception cycle based at least in part on the indication that the second UE supports the discontinuous reception operation, wherein receiving the wakeup signaling from the wireless device via the first UE is based at least in part on the discontinuous reception cycle.

Aspect 28: An apparatus for wireless communications, comprising at least one processor; memory coupled with the at least one processor; and instructions stored in the memory and executable by the at least one processor to cause the apparatus to perform a method of any of aspects 1 through 13.

Aspect 29: An apparatus for wireless communications, comprising at least one means for performing a method of any of aspects 1 through 13.

Aspect 30: A non-transitory computer-readable medium storing code for wireless communications, the code comprising instructions executable by a processor to perform a method of any of aspects 1 through 13.

Aspect 31: An apparatus for wireless communications, comprising at least one processor; memory coupled with the at least one processor; and instructions stored in the memory and executable by the at least one processor to cause the apparatus to perform a method of any of aspects 14 through 27.

Aspect 32: An apparatus for wireless communications, comprising at least one means for performing a method of any of aspects 14 through 27.

Aspect 33: A non-transitory computer-readable medium storing code for wireless communications, the code comprising instructions executable by a processor to perform a method of any of aspects 14 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using at least one general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by at least one processor, the functions may be stored as or transmitted using one or more instructions or code of a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or at least one general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), or ascertaining. Also, "determining" or "identifying" can include receiving (such as receiving information or signaling, e.g., receiving information or signaling for determining, receiving information or signaling for identifying) or accessing (such as accessing data in a memory, or accessing information). Also, "determining" or "identifying" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:

one or more memories storing processor-executable code; and one or more processors coupled with the one or more memories and individually or collectively operable to execute the code to cause the apparatus to:

transmit, by a first user equipment (UE), capability information indicating that the first UE is capable of relaying wakeup signaling from a wireless device to a second UE associated with a wakeup radio;

receive the wakeup signaling from the wireless device based at least in part on transmitting the capability information; and transmit the wakeup signaling to the second UE associated with the wakeup radio.

2. The apparatus of claim 1, wherein the one or more processors are individually or collectively further operable to execute the code to cause the apparatus to:

receive one or more parameters for transmitting the wakeup signaling to the second UE, the one or more parameters comprising a repetition factor, a transmit power, a periodicity, a waveform, a modulation and coding scheme, or any combination thereof, wherein transmitting the wakeup signaling is based at least in part on the one or more parameters.

3. The apparatus of claim 2, wherein the one or more processors are individually or collectively further operable to execute the code to cause the apparatus to:

receive a request to update the one or more parameters from the second UE based at least in part on an indication in the capability information that the first UE is capable of receiving wakeup radio signaling from the second UE.

4. The apparatus of claim 2, wherein the one or more processors are individually or collectively further operable to execute the code to cause the apparatus to:

receive an update of the one or more parameters from the wireless device based at least in part on an indication in the capability information that the first UE is not capable of receiving wakeup radio signaling from the second UE, wherein the wireless device comprises a network entity.

5. The apparatus of claim 1, wherein the one or more processors are individually or collectively further operable to execute the code to cause the apparatus to:

transmit, via the capability information, an indication of one or more wakeup message types that the first UE is capable of transmitting, the one or more wakeup message types comprising a wakeup signal, a wakeup reference signal, a synchronization signal, or any combination thereof, wherein transmitting the wakeup signaling comprises transmitting one of the one or more wakeup message types transmitted via the capability information.

6. The apparatus of claim 1, wherein, to transmit the wakeup signaling, the one or more processors are individually or collectively operable to execute the code to cause the apparatus to:

transmit the wakeup signaling to the wakeup radio of the second UE indicating that the second UE is to wake up a main radio of the second UE for wireless communications via a first radio access technology of a plurality of radio access technologies supported by the second UE, wherein the wakeup signaling comprises a first waveform of a plurality of waveforms corresponding to respective radio access technologies of the plurality of radio access technologies, or is transmitted via a first set of resources of a plurality of sets of resources corresponding to respective radio access technologies of the plurality of radio access technologies.

7. The apparatus of claim 1, wherein the one or more processors are individually or collectively further operable to execute the code to cause the apparatus to:

transmit, via the capability information, an indication that the first UE is capable of supporting a wakeup radio, or both a wakeup radio and a main radio, for a set of frequency resources, an indication of one or more candidate parameters for the wakeup signaling corresponding to the wakeup radio, the main radio, or both, or any combination thereof.

8. The apparatus of claim 1, wherein the one or more processors are individually or collectively further operable to execute the code to cause the apparatus to:

transmit, to the second UE, an indication of a threshold distance from the wireless device corresponding to wakeup signaling, wherein receiving the wakeup signaling from the wireless device is based at least in part on a location of the second UE satisfying the threshold distance.

9. The apparatus of claim 1, wherein, to transmit the capability information, the one or more processors are individually or collectively operable to execute the code to cause the apparatus to:

transmit an initial registration message, a random access message, a radio resource control message, or any combination thereof, to the wireless device, wherein the wireless device comprises a network entity.

10. The apparatus of claim 1, wherein, to transmit the capability information, the one or more processors are individually or collectively operable to execute the code to cause the apparatus to:

transmit a sidelink control information message, a sidelink radio resource control message, or any combination thereof, to the wireless device, wherein the wireless device comprises a primary sidelink UE.

11. The apparatus of claim 1, wherein transmitting the capability information is based at least in part on a power level or charging rate at the first UE satisfying a threshold.

12. An apparatus for wireless communications, comprising:

one or more memories storing processor-executable code; and one or more processors coupled with the one or more memories and individually or collectively operable to execute the code to cause the apparatus to:

transmit capability information indicating that a second user equipment (UE) associated with a wakeup radio is capable of receiving wireless signaling via the wakeup radio, or both the wakeup radio and a main radio, for a set of frequency resources, the capability information further comprising an indication of one or more candidate parameters for wakeup signaling corresponding to the wakeup radio, the main radio, or both, or any combination thereof;

receive control signaling comprising one or more parameters for receiving the wakeup signaling from a first UE by the second UE;

monitor for the wakeup signaling according to the one or more parameters; and receive the wakeup signaling from a wireless device via the first UE based at least in part on the monitoring.

13. The apparatus of claim 12, wherein:

the one or more parameters comprise a repetition factor, a transmit power, a periodicity a waveform, a modulation and coding scheme, or any combination thereof, and wherein the wakeup signaling is received based at least in part on the one or more parameters.

14. The apparatus of claim 13, wherein the one or more processors are individually or collectively further operable to execute the code to cause the apparatus to:

transmit, to the wireless device or the first UE, a request for the one or more parameters prior to entering a sleep mode, wherein receiving the one or more parameters is based at least in part on transmitting the request.

15. The apparatus of claim 14, wherein, to transmit the request for the one or more parameters, the one or more processors are individually or collectively operable to execute the code to cause the apparatus to:

transmit an indication of the one or more candidate parameters comprising the one or more parameters based at least in part on a current location of the second UE, a power state of the second UE, a charging rate profile at the second UE, or any combination thereof.

16. The apparatus of claim 13, wherein the one or more processors are individually or collectively further operable to execute the code to cause the apparatus to:

transmit, to the wireless device or the first UE, a request to update the one or more parameters;

receive, from the wireless device or the first UE, an update of the one or more parameters based at least in part on transmitting the request; and receive additional wakeup signaling from the first UE according to the update of the one or more parameters.

17. The apparatus of claim 12, wherein, to receive the wakeup signaling, the one or more processors are individually or collectively operable to execute the code to cause the apparatus to:

receive the wakeup signaling using the wakeup radio of the second UE, the wakeup signaling indicating that the second UE is to wake up the main radio of the second UE for wireless communications via a first radio access technology of a plurality of radio access technologies supported by the second UE, wherein the wakeup signaling comprises a first waveform of a plurality of waveforms corresponding to respective radio access technologies of the plurality of radio access technologies, or is transmitted via a first set of resources of a plurality of sets of resources corresponding to respective radio access technologies of the plurality of radio access technologies.

18. The apparatus of claim 17, wherein the one or more parameters comprise an indication of the plurality of radio access technologies, the plurality of sets of resources, the plurality of waveforms, or any combination thereof.

19. The apparatus of claim 12, wherein the one or more processors are individually or collectively further operable to execute the code to cause the apparatus to:

receive, from the wireless device or the first UE, an indication of a set of candidate UEs comprising the first UE, each of the set of candidate UEs being capable of relaying wakeup signaling to the second UE, wherein the monitoring is based at least in part on the indication of the set of candidate UEs.

20. The apparatus of claim 12, wherein the one or more processors are individually or collectively further operable to execute the code to cause the apparatus to:

transmit one or more reference signals to the wireless device prior to entering a sleep mode, the wireless device comprising a network entity, wherein receiving the wakeup signaling from the wireless device via the first UE is based at least in part on transmitting the one or more reference signals.

21. The apparatus of claim 12, wherein the one or more processors are individually or collectively further operable to execute the code to cause the apparatus to:

transmit, to the wireless device, mobility information indicating a location of the second UE, a direction of the second UE, a speed of the second UE, an indication that the second UE is exiting a coverage area, or any combination thereof, wherein receiving the wakeup signaling from the wireless device via the first UE is based at least in part on transmitting the mobility information.

22. The apparatus of claim 12, wherein the wireless device comprises a network entity or a sidelink UE.

23. A method for wireless communications, comprising:

transmitting, by a first user equipment (UE), capability information indicating that the first UE is capable of relaying wakeup signaling from a wireless device to a second UE associated with a wakeup radio;

receiving the wakeup signaling from the wireless device based at least in part on transmitting the capability information; and transmitting the wakeup signaling to the second UE associated with the wakeup radio.

24. The method of claim 23, further comprising:

receiving one or more parameters for transmitting the wakeup signaling to the second UE, the one or more parameters comprising a repetition factor, a transmit power, a periodicity, a waveform, a modulation and coding scheme, or any combination thereof, wherein transmitting the wakeup signaling is based at least in part on the one or more parameters.

25. The method of claim 23, further comprising:

transmitting, via the capability information, an indication of one or more wakeup message types that the first UE is capable of transmitting, the one or more wakeup message types comprising a wakeup signal, a wakeup reference signal, a synchronization signal, or any combination thereof, wherein transmitting the wakeup signaling comprises transmitting one of the one or more wakeup message types transmitted via the capability information.

26. The method of claim 23, wherein transmitting the wakeup signaling comprises:

transmitting the wakeup signaling to the wakeup radio of the second UE indicating that the second UE is to wake up a main radio of the second UE for wireless communications via a first radio access technology of a plurality of radio access technologies supported by the second UE, wherein the wakeup signaling comprises a first waveform of a plurality of waveforms corresponding to respective radio access technologies of the plurality of radio access technologies, or is transmitted via a first set of resources of a plurality of sets of resources corresponding to respective radio access technologies of the plurality of radio access technologies.

27. The method of claim 23, further comprising:

transmitting, via the capability information, an indication that the first UE is capable of supporting a wakeup radio, or both a wakeup radio and a main radio, for a set of frequency resources, an indication of one or more candidate parameters for the wakeup signaling corresponding to the wakeup radio, the main radio, or both, or any combination thereof.

28. A method for wireless communications, comprising:

transmitting capability information indicating that a second UE associated with a wakeup radio is capable of receiving wireless signaling via the wakeup radio, or both the wakeup radio and a main radio, for a set of frequency resources, the capability information further comprising an indication of one or more candidate parameters for wakeup signaling corresponding to the wakeup radio, the main radio, or both, or any combination thereof;

receiving control signaling comprising one or more parameters for receiving the wakeup signaling from a first UE by the second UE;

monitoring for the wakeup signaling according to the one or more parameters; and receiving the wakeup signaling from a wireless device via the first UE based at least in part on the monitoring.

29. The method of claim 28, wherein receiving the wakeup signaling comprises:

receiving the wakeup signaling using the wakeup radio of the second UE, the wakeup signaling indicating that the second UE is to wake up the main radio of the second UE for wireless communications via a first radio access technology of a plurality of radio access technologies supported by the second UE, wherein the wakeup signaling comprises a first waveform of a plurality of waveforms corresponding to respective radio access technologies of the plurality of radio access technologies, or is transmitted via a first set of resources of a plurality of sets of resources corresponding to respective radio access technologies of the plurality of radio access technologies.

* * * * *